US012394269B2

(12) United States Patent
Fujii et al.

(10) Patent No.: US 12,394,269 B2
(45) Date of Patent: Aug. 19, 2025

(54) COIN PROCESSING DEVICE

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventors: Kota Fujii, Osaka (JP); Naruto Okahashi, Sanda (JP); Nobuo Hamada, Osaka (JP); Ryo Tanaka, Osaka (JP)

(73) Assignees: LAUREL BANK MACHINES CO., LTD., Tokyo (JP); LAUREL PRECISION CO., LTD., Osaka (JP)

( * ) Notice: Subject to any disclaimer, the term of this patent is extended or adjusted under 35 U.S.C. 154(b) by 998 days.

(21) Appl. No.: 17/437,727

(22) PCT Filed: Feb. 21, 2020

(86) PCT No.: PCT/JP2020/007147
§ 371 (c)(1),
(2) Date: Sep. 9, 2021

(87) PCT Pub. No.: WO2020/184152
PCT Pub. Date: Sep. 17, 2020

(65) Prior Publication Data

US 2022/0148359 A1 May 12, 2022

(30) Foreign Application Priority Data

Mar. 14, 2019 (JP) ................................ 2019-046928

(51) Int. Cl.
*G07D 3/14* (2006.01)
*G07D 3/06* (2006.01)
*G07D 5/08* (2006.01)

(52) U.S. Cl.
CPC ................ *G07D 3/14* (2013.01); *G07D 3/06* (2013.01); *G07D 5/08* (2013.01)

(58) Field of Classification Search
CPC .. G07D 3/14; G07D 3/06; G07D 5/08; G07D 9/008; G07D 9/04
(Continued)

(56) References Cited

U.S. PATENT DOCUMENTS 4,199,911 A 4/1980 Miyazaki et al.
4,356,829 A * 11/1982 Furuya .................... G07D 9/00 221/21
(Continued)

FOREIGN PATENT DOCUMENTS

CN 1133645 A 10/1996
CN 107346572 A 11/2017
(Continued)

OTHER PUBLICATIONS

Notice of Allowance mailed Aug. 28, 2023 in Chinese Application No. 202080020418.2, with English translation, 9 pages.
(Continued)

*Primary Examiner* — Jeffrey A Shapiro
(74) *Attorney, Agent, or Firm* — Nixon & Vanderhye P.C.

(57) ABSTRACT

A coin processing device includes: a feed belt that normally rotates in contact with the upper side of a coin to convey the coin to a conveyance passage extending from an inlet-side passage portion to an outlet-side passage portion; a conveyance motor that normally rotates the feed belt during the normal rotation; a detection unit that detects the coin passing through a position determined in advance in the conveyance passage; and a control unit that switches the conveyance motor from a first rotation state where the conveyance motor normally rotates at a first rotation speed to a second rotation state where the conveyance motor normally rotates at a
(Continued)

second rotation speed slower than the first rotation speed, in response to detection of the coin by the detection unit, and then rotates the conveyance motor.

1 Claim, 9 Drawing Sheets

(58) Field of Classification Search
USPC .................................................. 453/7, 11, 56
See application file for complete search history.

(56) References Cited

U.S. PATENT DOCUMENTS

| | | | | | |
|---|---|---|---|---|---|
| 5,542,880 | A * | 8/1996 | Geib | G07D 3/16 | 453/10 |
| 5,908,351 | A * | 6/1999 | Tanaka | G07D 3/02 | 453/11 |
| 6,640,956 | B1 * | 11/2003 | Zwieg | G07D 3/06 | 453/30 |
| RE44,689 | E * | 1/2014 | Wendell | G07D 3/00 | 453/57 |
| 2015/0011145 | A1 * | 1/2015 | Suetomi | G07D 9/00 | 453/4 |
| 2018/0108198 | A1 | 4/2018 | Rasmusssen | | |

FOREIGN PATENT DOCUMENTS

| | | | |
|---|---|---|---|
| JP | 02-193287 | | 7/1990 |
| JP | 2001-043424 | A | 2/2001 |
| JP | 2003-063698 | A | 3/2003 |
| JP | 2009-087296 | A | 4/2009 |
| JP | 2014-099131 | A | 5/2014 |
| JP | 2016-162156 | A | 9/2016 |
| JP | 2017-010472 | | 1/2017 |
| JP | 2017-182273 | | 10/2017 |
| JP | 2018-005656 | A | 1/2018 |
| JP | 2018-206021 | A | 12/2018 |
| JP | 2018-206022 | | 12/2018 |
| JP | 2019-021135 | | 2/2019 |
| WO | WO 95/06920 | A1 | 3/1995 |

OTHER PUBLICATIONS

Notice of Reasons for Rejection mailed Jun. 21, 2022 in Japanese Application No. 2019-046928, with English translation, 8 pages.
International Search Report for PCT/JP2020/007147 dated Mar. 31, 2020, 4 pages.
Chinese Office Action mailed Oct. 10, 2022 in Chinese Application No. 202080020418.2, with English translation of Search Report, 10 pages.
Extended European Search Report mailed Nov. 7, 2022 in European Application No. 20768967.0, 6 pages.

* cited by examiner

COIN PROCESSING DEVICE

This application is the U.S. national phase of International Application No. PCT/JP2020/007147 filed Feb. 21, 2020 which designated the U.S. and claims priority to Japanese Patent Application No. 2019-046928, filed Mar. 14, 2019, the entire contents of each of which are incorporated herein by reference.

TECHNICAL FIELD

The present invention relates to a coin processing device.

Priority is claimed on Japanese Patent Application No. 2019-046928, filed Mar. 14, 2019, the content of which is incorporated herein by reference.

BACKGROUND ART

Patent Document 1 below discloses a coin processing device having a mechanism for removing unacceptable coins. When an unacceptable coin is detected, the coin processing device holds the unacceptable coin between first stopper means and second stopper means provided on the downstream side of a coin collection port in a conveyance guide through which the coin passes. Next, the coin processing device returns all the coins following the unacceptable coin onto a rotating disk of a coin pool part, and then sets the interval between guide plates forming a coin sorting passage to be larger than the diameter of the largest-diameter coin to be processed. Next, the coin processing device releases the holding of the unacceptable coin by the first stopper means and the second stopper means. Thereafter, the coin processing device reversely conveys the unacceptable coin to the upstream side in the conveyance, that is, the rotating disk side of the coin pool part, and causes the unacceptable coin to fall into the coin collection port between the guide plates, where it is collected by collection means.

PRIOR ART DOCUMENTS

Patent Document

Patent Document 1

Japanese Unexamined Patent Application, First Publication No. H02-193287

SUMMARY OF THE INVENTION

Problems to be Solved by the Invention

In the device disclosed in Patent Document 1, a structure is made in which the coin is stopped by causing protrusion portions of the first and second stopper means to enter the inside of a conveyance path from the right and left side surface portions of the conveyance guide through which the coin passes, by the driving of each solenoid. In addition to this method, there is also known a method of stopping a coin by causing a pin-shaped protrusion portion to protrude into a conveyance path from the upper side or the lower side of the conveyance path by the driving of a solenoid to bring it into contact with the conveyed coin.

In this manner, in order to prevent a target coin such as an unacceptable coin from being conveyed to the downstream side of a predetermined position on a coin conveyance path, in the coin processing device of the related art, a stopper mechanism that is composed of a drive source (an electrical part) such as a solenoid (a plunger solenoid or a rotary solenoid) and a protrusion portion (a mechanical member) needs to be provided. Therefore, the cost of the coin processing device of the related art becomes high. Further, in the coin processing device of the related art, an occupied space for incorporating the stopper mechanism is required, and therefore the layout inside the device is restricted. Further, in the coin processing device of the related art, since the coin is stopped by bringing the protrusion portion into contact with the coin which is being conveyed at a high speed, a collision sound is generated at the time of collision between the coin and the protrusion portion, and they collide with or rub against each other and generate dust.

An object of the present invention is to provide a coin processing device in which a manufacturing cost can be reduced, the degree of freedom of layout in the device can be improved, and a reduction in noise and dust suppression can be attained.

Means for Solving the Problems

In order to achieve the above object, according to a first aspect of the present invention, there is provided a coin processing device including: a feed belt that normally rotates in contact with an upper side of a coin to convey the coin to a conveyance passage extending from an inlet-side passage portion to an outlet-side passage portion; a conveyance motor that normally rotates the feed belt during the normal rotation; a detection unit that detects the coin passing through a position determined in advance in the conveyance passage; and a control unit that switches the conveyance motor from a first rotation state where the conveyance motor normally rotates at a first rotation speed to a second rotation state where the conveyance motor normally rotates at a second rotation speed slower than the first rotation speed, in response to detection of the coin by the detection unit, and then rotates the conveyance motor.

According to the first aspect, the control unit switches the conveyance motor that normally rotates from the first rotation state to the second rotation state in response to the detection of the detection unit and then rotates the conveyance motor. In this way, the conveyance speed of the coins to be stopped is switched to a lower speed and then stopped. Therefore, it is possible to accurately stop the coin to be stopped. Accordingly, a stopper mechanism is not required in the conveyance passage of the coin processing device.

In a coin processing device according to a second aspect of the present invention, in the first aspect described above, a falling portion for causing the coin to fall from the outlet-side passage portion is provided on a downstream side of the outlet-side passage portion opposite to the inlet-side passage portion, and the control unit performs stop control for stopping one coin to be stopped on the outlet-side passage portion that is on the downstream side with respect to the detection unit, by switching the conveyance motor from the first rotation state to the second rotation state in response to detection of the one coin to be stopped by the detection unit, and then stopping the conveyance motor in response to a change from a detection state where the detection unit detects the one coin to be stopped to a non-detection state where the detection unit does not detect the one coin to be stopped.

According to the second aspect, the control unit performs the stop control for switching the conveyance motor from the first rotation state to the second rotation state, based on the detection of one coin to be stopped by the detection unit, and then stopping the conveyance motor in response to a change from the detection state of one coin to be stopped by the detection unit to the non-detection state. In this stop control, since one coin to be stopped is stopped on the outlet-side passage portion that is on the downstream side with respect to the detection unit, the one coin to be stopped does not fall into the falling portion. Accordingly, even if there is no stopper mechanism, the coin to be stopped can be kept on the outlet-side passage portion without falling into the falling portion.

In a coin processing device according to a third aspect of the present invention, in the second aspect described above, the outlet-side passage portion has an outlet-side passage end portion that is disposed between the detection unit and the falling portion, and the outlet-side passage end portion has a size in which one coin with a smallest diameter among coins to be processed can remain and two or more coins cannot remain.

According to the third aspect, the outlet-side passage portion has the outlet-side passage end portion having a size in which one coin with the smallest diameter among coins to be processed can remain and two or more coins cannot remain, between the detection unit and the falling portion. Therefore, only one coin to be stopped can be stopped at the outlet-side passage end portion, and it is possible to cause all the coins that have been conveyed in the direction of the downstream side ahead of the coin to fall into the falling portion. Accordingly, even if there is no stopper mechanism, it is possible to cause all the coins that have been conveyed in the direction of the downstream side ahead of one coin to be stopped to fall into the falling portion.

In a coin processing device according to a fourth aspect of the present invention, in the third aspect described above, after the control unit performs the stop control, the control unit reversely rotates the conveyance motor to perform switching to conveyance of the coin toward an upstream side opposite to the downstream side, and then confirms the detection state of the one coin to be stopped by the detection unit.

According to the fourth aspect, after the control unit performs the stop control, the control unit reversely rotates the conveyance motor to perform switching to conveyance of the coin toward an upstream side opposite to the downstream side. Thereafter, the control unit confirms the detection state of the one coin to be stopped by the detection unit. In this way, it is possible to determine that none of the coins conveyed in the direction of the downstream side ahead of the one coin to be stopped remain on the outlet-side passage portion. Accordingly, even if there is no stopper mechanism, it is possible to determine that all the coins conveyed in the direction of the downstream side ahead of the one coin to be stopped have fallen into the falling portion.

In a coin processing device according to a fifth aspect of the present invention, in any one of the second to fourth aspects described above, the detection unit includes a magnetic sensor, and when a coin other than a falling target to be caused to fall into the falling portion is detected based on the detection of the detection unit, the control unit sets the coin to be the one coin to be stopped.

According to the fifth aspect, since the detection unit includes a magnetic sensor, the detection of one coin to be stopped and the detection of a coin of a denomination different from a designated denomination can be performed with the same magnetic sensor. Accordingly, the cost can be further reduced.

In a coin processing device according to a sixth aspect of the present invention, in any one of the second to fifth aspects described above, the control unit switches the conveyance motor from a third rotation state where the conveyance motor rotates at a third rotation speed faster than the first rotation speed in the first rotation state to the first rotation state, in response to the detection of one coin on the downstream side with respect to the one coin to be stopped by the detection unit.

According to the sixth aspect, the control unit switches the conveyance motor from the third rotation state having the third rotation speed faster than the first rotation speed in the first rotation state, to the first rotation state, in response to the detection of one coin on the downstream side with respect to the one coin to be stopped by the detection unit. Therefore, the control unit can switch from the third rotation state to the first rotation state having a lower speed than the third rotation state, and then switch from the first rotation state to the second rotation state having a lower speed than the first rotation state. Accordingly, the conveyance speed of the coin to be stopped is switched to a lower speed and then stopped, so that it is possible to more accurately stop the coin to be stopped.

Advantageous Effects of the Invention

According to the present invention, it is possible to provide a coin processing device in which the cost of the coin processing device is reduced, the degree of freedom of layout inside the device is improved, and a reduction in noise and dust suppression are attained.

EMBODIMENTS FOR CARRYING OUT THE INVENTION

A coin processing device according to an embodiment of the present invention will be described below with reference to the drawings.

A coin processing device 11 of the present embodiment is for counting coins of one designated denomination to be counted. Specifically, in the coin processing device 11, processing target coins that can be selected and set as coins of a denomination to be counted are six denominations: 1-yen coins, 5-yen coins, 10-yen coins, 50-yen coins, 100-yen coins, and 500-yen coins. The coin processing device 11 counts the coins of the denomination to be counted selected from among these denominations.

Figure 1:
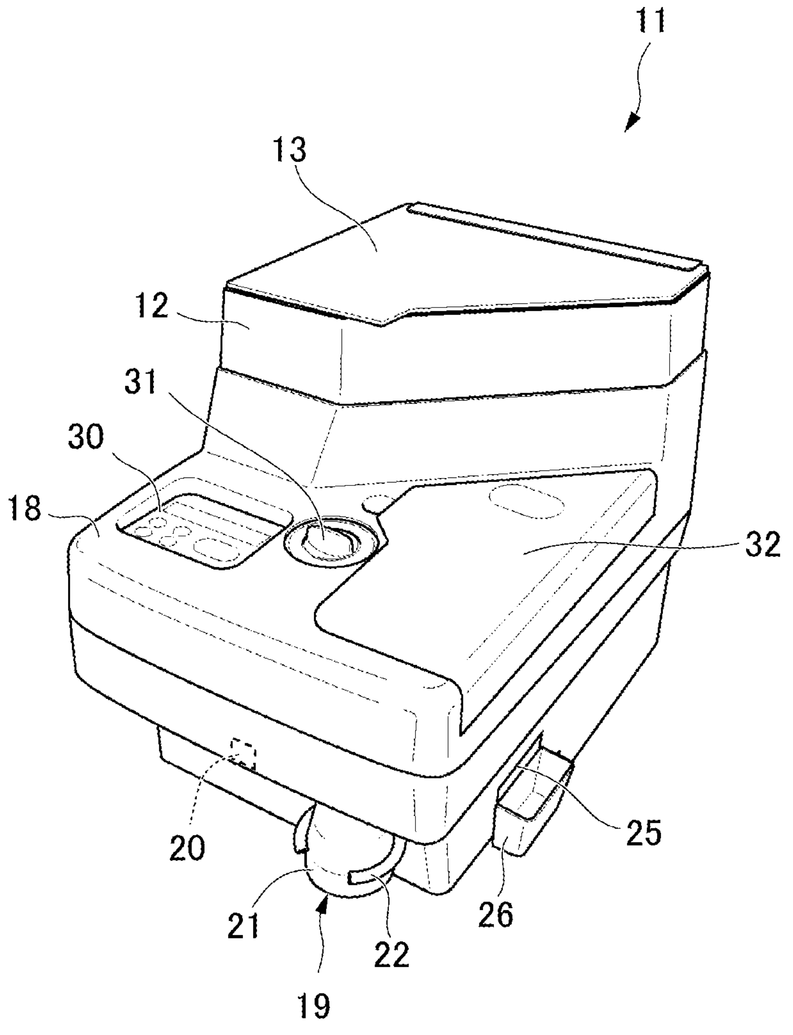
FIG. 1 is a perspective view showing a coin processing device according to an embodiment of the present invention.
Figure 2:
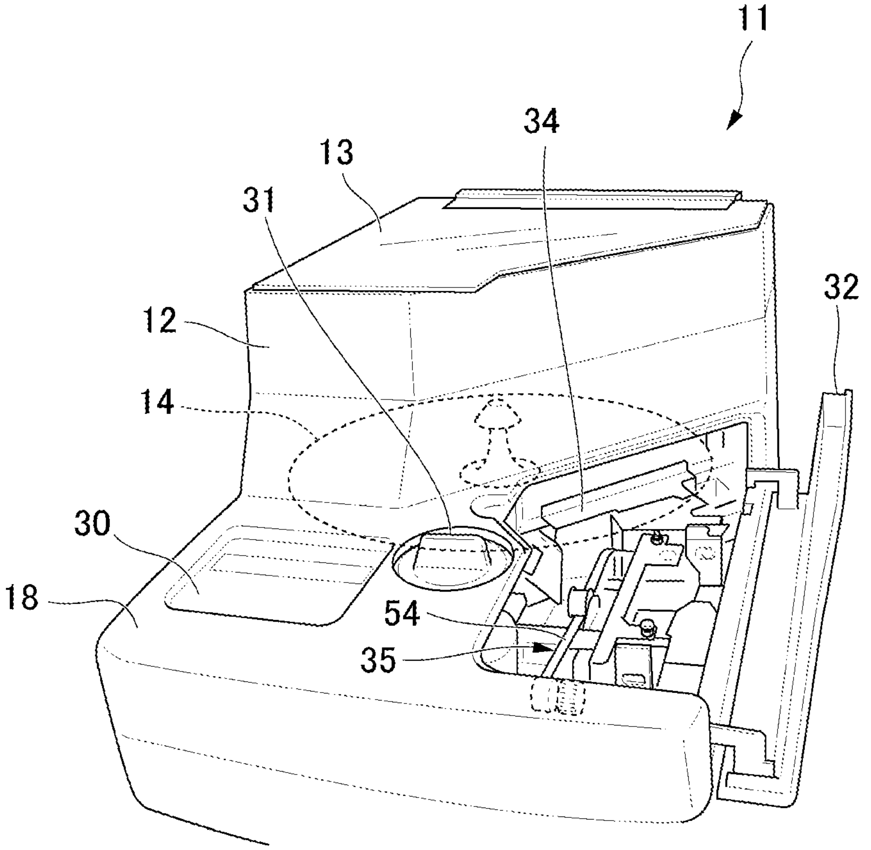
FIG. 2 is a partial perspective view showing a state where a feed part cover of the coin processing device according to the embodiment of the present invention is opened.

As shown in FIG. 1, the coin processing device 11 has, at an upper portion thereof, a hopper 12 serving as a coin pool part that opens upward and pools input coins, and a hopper cover 13 that opens and closes the upper opening of the hopper 12. As shown in FIG. 2, a rotating disk 14 is disposed below the hopper 12. The rotating disk 14 is driven by a feeding motor 16 that is controlled by a control unit 15 shown in FIG. 3, and rotates around a vertical axis. The hopper 12 is provided with a residual detection sensor 17 that detects coins remaining in the hopper 12. The residual detection sensor 17 outputs a detection result to the control unit 15.

As shown in FIG. 1, the coin processing device 11 has a main body part 18 protruding forward (to the operator side) from the hopper 12, on the lower side with respect to the hopper 12. The main body part 18 has, at a front portion thereof, a chute 19 protruding downward and a power switch 20. The chute 19 has a chute main body 21 that discharges the coins of the denomination to be counted after counting to the outside. Further, the chute 19 has a locking ring 22 for locking a storage bag (not shown) to the chute main body 21.

A discharge port 25 for discharging coins of a denomination different from the denomination to be counted to the outside of the coin processing device 11 is provided at a side portion of the main body part 18. An exclusion box 26 having an upper opening and receiving and accommodating the coins discharged from the discharge port 25 is provided at the side portion of the main body part 18.

The main body part 18 has, on the upper surface of a portion on the front side with respect to the hopper 12, an operation display unit 30 that receives a pressing operation from an operator and performs display toward the operator, and a course width adjusting knob 31 that is rotated by the operator. A feed part cover 32 that covers the inside of the main body part 18 when it is in a closed state, as shown in FIG. 1, and partially opens the inside of the main body part 18 when it is in an open state, as shown in FIG. 2, is provided on the front-side upper surface of the main body part 18. When the coin of the denomination to be counted is selected from among the coins to be processed, the course width adjusting knob 31 is rotated to be fitted to a position corresponding to the coin of the denomination to be counted.

As shown in FIG. 2, a sorting ring 34, a conveyance drive unit 35, a conveyance passage 60 (FIG. 4), and an identification counting unit 37 (a detection unit) are provided at the positions below the feed part cover 32 inside the main body part 18. The sorting ring 34 separates one by one the coins that are fed from the rotating disk 14. The conveyance drive unit 35 conveys the coins separated and fed one by one by the sorting ring 34 from the rotating disk 14. The identification counting unit 37 (the detection unit) detects the coins C that are being conveyed through the conveyance passage 60 by the conveyance drive unit 35 when it passes through a predetermined position in the conveyance passage 60. The identification counting unit 37 (the detection unit) includes a magnetic sensor that performs the identification and counting of the coins C. The identification counting unit 37 outputs magnetic data, which is a detection result, to the control unit 15 shown in FIG. 3.

Figure 3:
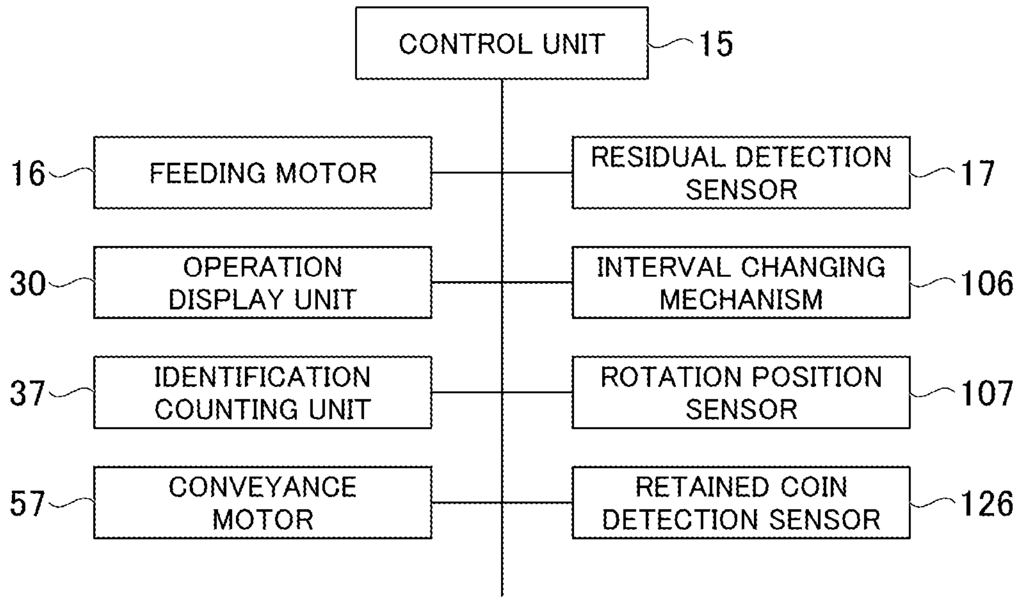
FIG. 3 is a block diagram showing a configuration of a control system of the coin processing device according to the embodiment of the present invention.
Figure 4:
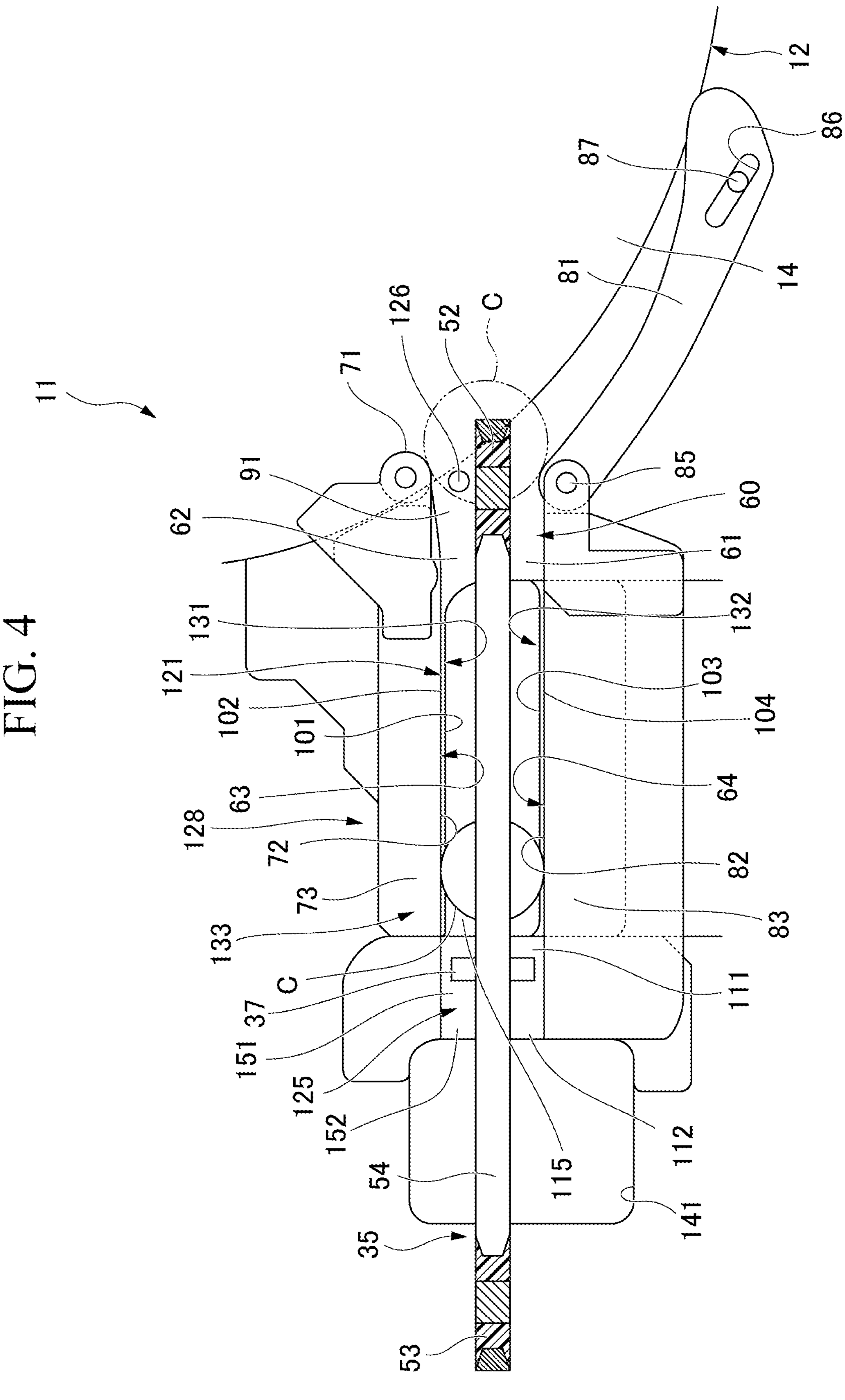
FIG. 4 is a plan view, partly in section, showing a main part of the coin processing device according to the embodiment of the present invention.
Figure 5:
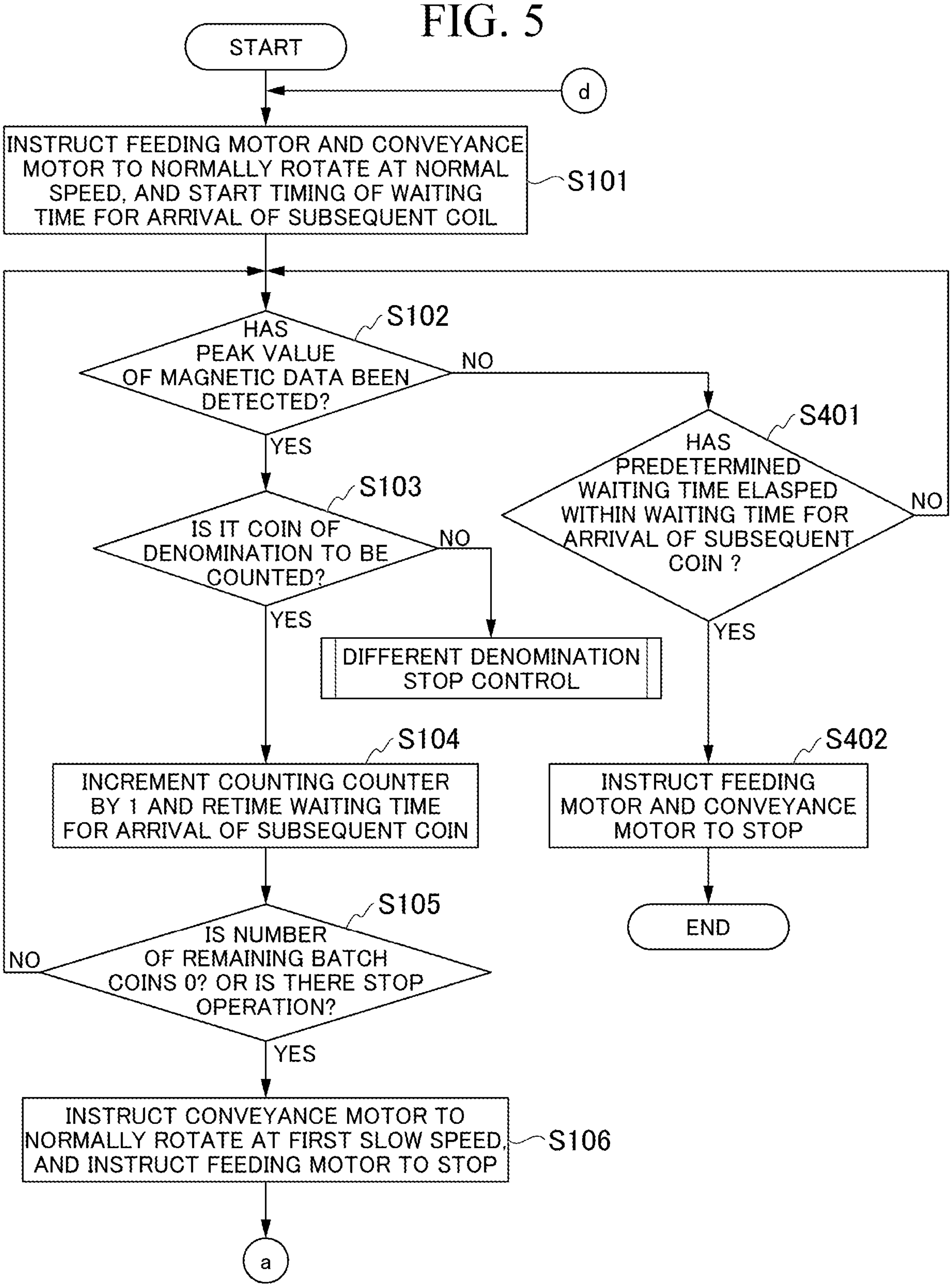
FIG. 5 is a flowchart showing a part of batch processing that is executed by the coin processing device according to the embodiment of the present invention.

As shown in FIG. 4, the conveyance drive unit 35 has a take-in pulley 52, a drive pulley 53, an endless feed belt 54, and a conveyance motor 57 (FIG. 3) that drives them. The take-in pulley 52 is disposed at an upper portion on the outer periphery side of the rotating disk 14. The drive pulley 53 is disposed in parallel with the take-in pulley 52 at a position away from the rotating disk 14 such that the position in an axial direction and the height are aligned with those of the take-in pulley 52. The feed belt 54 is wound around the take-in pulley 52 and the drive pulley 53. The rotation state of the conveyance motor 57 is controlled by the control unit 15.

As shown in FIG. 4, the take-in pulley 52 and the drive pulley 53 support the feed belt 54 at both ends thereof. In addition to the take-in pulley 52 and the drive pulley 53, one or a plurality of intermediate pulleys that support the feed belt 54 at the intermediate position thereof may be provided. The drive pulley 53 of the conveyance drive unit 35 is driven and rotated by the conveyance motor 57 shown in FIG. 3. The take-in pulley 52 shown in FIG. 4 is a driven pulley that is driven with respect to the drive pulley 53 by being driven through the feed belt 54 by the drive pulley 53. The conveyance motor 57 is a stepping motor. The conveyance motor 57 rotates the drive pulley 53, the feed belt 54, and the take-in pulley 52 by being rotated to be controlled by the control unit 15 shown in FIG. 3.

As shown in FIG. 4, the conveyance passage 60 for conveying the coins C is provided below the feed belt 54 to extend along the feed belt 54 inside the main body part 18 shown in FIG. 2. The conveyance passage 60 has an inlet-side passage portion 61 that is disposed below the position of the take-in pulley 52. The conveyance passage 60 further has a pair of wall portions 63 and 64 that are disposed on both sides with the feed belt 54 interposed therebetween and stand vertically from an upper surface 62 of the inlet-side passage portion 61. The upper surface 62 of the inlet-side passage portion 61 is horizontally disposed, and supports the lower surfaces of the coins C fed from the rotating disk 14 from below.

The coins C are separated from the rotating disk 14 one by one by the sorting ring 34 (FIG. 2) and fed onto the upper surface 62 of the inlet-side passage portion 61. The conveyance drive unit 35 conveys the coins C between the pair of wall portions 63 and 64 with the feed belt 54 in contact with the upper sides of the coins C fed to the inlet-side passage portion 61.

The wall portion 63 on one side includes an inlet roller 71 whose side closest to the rotating disk 14 is supported to be rotatable around the vertical axis. The wall portion 63 is provided with a fixed wall 73 that is fixed in position and has, on the wall portion 64 side, a wall surface 72 extending along the feed belt 54 away from the rotating disk 14. The fixed wall 73 extends to the side opposite to the rotating disk 14 with respect to the inlet-side passage portion 61. The wall surface 72 of the fixed wall 73 stands vertically from the upper surface 62 of the inlet-side passage portion 61.

The wall portion 64 on the other side includes an arc-shaped guide wall 81 whose side closest to the rotating disk 14 is curved along the outer peripheral surface of the rotating disk 14. The wall portion 64 is provided with a movable wall 83 having, on the wall portion 63 side, a wall surface 82 extending along the feed belt 54 from the vicinity of the end portion on the take-in pulley 52 side of the guide wall 81. The movable wall 83 extends to the side opposite to the rotating disk 14 with respect to the inlet-side passage portion 61. The wall surface 82 of the movable wall 83 stands vertically from the upper surface 62 of the inlet-side passage portion 61.

The wall surface 82 of the movable wall 83 and the wall surface 72 of the fixed wall 73 are parallel to each other and face each other with the height positions aligned with each other. The movable wall 83 horizontally moves toward and away from the fixed wall 73 while maintaining the positional relationship with the fixed wall 73 in the extending direction, in a state where the wall surface 82 is parallel to the wall surface 72 of the fixed wall 73.

One end of the guide wall 81 is connected to the movable wall 83 by a connection pin 85 extending vertically. In this way, the guide wall 81 is rotatable around the connection pin 85. Further, the guide wall 81 has an elongated hole 86 formed at the other end thereof to extend in a length direction. A pin 87 fixed in position and extending vertically is disposed in the elongated hole 86. When the movable wall 83 moves, the guide wall 81 rotates with respect to the movable wall 83 with the connection pin 85 as the center while moving with respect to the pin 87 in the elongated hole 86. In this way, the guide wall 81 follows the movement of the movable wall 83.

An inlet 91 on the rotating disk 14 side of the pair of wall portions 63 and 64 is formed by the inlet roller 71 and the end portion on the connection pin 85 side of the guide wall 81. The width of the inlet 91 is set to be equal to the interval between the wall surface 82 of the movable wall 83 and the wall surface 72 of the fixed wall 73. The guide wall 81 having a curved shape guides the coins C from the rotating disk 14 of the hopper 12 toward the space between the pair of wall portions 63 and 64. The end on the inlet 91 side of the guide wall 81 is connected to the movable wall 83 through the connection pin 85, and is configured to be movable in conjunction with the movable wall 83.

The conveyance passage 60 has, on the lower side of the fixed wall 73, a support portion 101 that is fixed in position and protrudes toward the movable wall 83 side with respect to the wall surface 72. The support portion 101 has an upper surface 102 that is disposed on the same plane as the upper surface 62 of the inlet-side passage portion 61. The support portion 101 extends from the inlet-side passage portion 61 to the side opposite to the rotating disk 14.

The conveyance passage 60 has, on the upper side of the movable wall 83, a support portion 103 protruding toward the fixed wall 73 side with respect to the wall surface 82. The support portion 103 has an upper surface 104 that is disposed on the same plane as the upper surface 62 of the inlet-side passage portion 61. The support portion 103 extends from the inlet-side passage portion 61 to the side opposite to the rotating disk 14. The support portion 103 is fixed to the movable wall 83 and moves integrally with the movable wall 83.

The conveyance passage 60 has an outlet-side passage portion 112 on the side opposite to the inlet-side passage portion 61 with respect to the pair of support portions 101 and 103. The outlet-side passage portion 112 has an upper surface 111 that is disposed on the same plane as the upper surfaces 62, 102, and 104. Here, the portion surrounded by the inlet-side passage portion 61, the pair of support portions 101 and 103, and the outlet-side passage portion 112 configures a rejection hole 115. That is, the pair of support portions 101 and 103 form the rejection hole 115 between them. The rejection hole 115 is connected to the discharge port 25 shown in FIG. 1. A coin C that has fallen into the rejection hole 115 is discharged from the discharge port 25 through a rejection chute (not shown) and is accommodated in the exclusion box 26. The pair of wall portions 63 and 64 guide the outer peripheral surface of the coin C between the inlet-side passage portion 61 and the outlet-side passage portion 112.

The pair of support portions 101 and 103 configure an intermediate passage portion 121 that supports the outer periphery sides of the lower surfaces of the coins C between the inlet-side passage portion 61 and the outlet-side passage portion 112. The upper surface 62 of the inlet-side passage portion 61, the upper surface 102 of the support portion 101 and the upper surface 104 of the support portion 103 of the intermediate passage portion 121, and the upper surface 111 of the outlet-side passage portion 112 configure a conveyance surface 125 that is the upper surface of the conveyance passage 60.

The outlet-side passage portion 112 has the identification counting unit 37. The identification counting unit 37 includes a magnetic sensor that detects the coins C moving on the outlet-side passage portion 112 and counts the coins C while identifying the denomination thereof. The conveyance passage 60 has a falling hole 141 (a falling portion) provided on the side opposite to the intermediate passage portion 121 of the outlet-side passage portion 112. The coins C are identified and counted by the identification counting unit 37 of the outlet-side passage portion 112, and then fall from the falling hole 141 (the falling portion) of the conveyance passage 60. In other words, the falling hole 141 for causing the coins C to fall from the outlet-side passage portion 112 is provided on the side opposite to the inlet-side passage portion 61 of the outlet-side passage portion 112. The coins C which have fallen from the falling hole 141 are discharged from the chute main body 21 (FIG. 1) of the chute 19 to the outside of the coin processing device 11 through an internal chute (not shown).

As shown in FIG. 4, the feed belt 54 of the conveyance drive unit 35 comes into contact with the upper sides of the coins C separated from the rotating disk 14 one by one by the sorting ring 34 (FIG. 2) and fed onto the inlet-side passage portion 61 (FIG. 4). The feed belt 54 conveys the coins C from the inlet 91 side of the pair of wall portions 63 and 64 toward the rejection hole 115. If the coins C do not fall at the rejection hole 115, the feed belt 54 further conveys the coins C toward the outlet-side passage portion 112 and finally causes the coins C to fall into the falling hole 141.

The coins C are fed one by one from the rotating disk 14 onto the upper surface 62 of the inlet-side passage portion 61 of the conveyance passage 60. The coins C are conveyed between the wall surface 72 of the fixed wall 73 and the wall surface 82 of the movable wall 83 in the pair of wall portions 63 and 64. That is, the feed belt 54 of the conveyance drive unit 35 comes contact with the coins C fed onto the upper surface 62 of the inlet-side passage portion 61 from the upper side and moves the coins C along the conveyance passage 60. At that time, in the coins C, while the outer peripheral surfaces thereof are guided by the pair of wall portions 63 and 64, the lower surfaces thereof move on the upper surfaces 102 and 104 of the pair of support portions 101 and 103 from the upper surface 62 of the inlet-side passage portion 61, and further move on the upper surface 111 of the outlet-side passage portion 112. At that time, the pair of support portions 101 and 103 support the outer periphery sides of the lower surfaces of the coins C by the upper surfaces 102 and 104.

In this way, the conveyance drive unit 35 and the conveyance passage 60 convey the coins C from the inlet-side passage portion 61 side toward the falling hole 141. In other words, the coins C are supported by the inlet-side passage portion 61, the pair of support portions 101 and 103, and the outlet-side passage portion 112, and are moved by the conveyance drive unit 35. At that time, the pair of wall portions 63 and 64 guide the outer peripheral surfaces of the coins C, and the pair of support portions 101 and 103 support the outer periphery sides of the lower surfaces of the coins C. The conveyance drive unit 35 and the conveyance passage 60 configure a coin conveyance unit 128 that sandwiches the coins C from above and below and conveys the coins C. The conveyance drive unit 35 configures a drive portion and an upper-side portion of the coin conveyance unit 128. The conveyance passage 60 configures a lower-side portion of the coin conveyance unit 128.

The outlet-side passage portion 112 has an outlet-side passage end portion 151 having a predetermined length, which is disposed between the identification counting unit 37 and the falling hole 141. An upper surface 152 of the outlet-side passage end portion 151 is disposed on the same plane as the upper surface 62 of the inlet-side passage portion 61 and the upper surfaces 102 and 104 of the pair of support portions 101 and 103, and configures a part of the upper surface 111 of the outlet-side passage portion 112.

The upper surface 152 of the outlet-side passage end portion 151 is set to a size in which one smallest-diameter coin (that is, the 1-yen coin in Japan) among the coins to be processed can be placed (can remain) thereon in a state where the smallest-diameter coin is pressed from above by the feed belt 54, but two or more coins cannot be placed (cannot remain). Therefore, the outlet-side passage end portion 151 has a size in which, with respect to all the denominations of the coins to be processed, only one coin can be placed while being pressed from above by the feed belt 54. In other words, the outlet-side passage end portion 151 has a size in which, with respect to the coins of all the denominations of the coins to be processed, two coins cannot be arranged in series while being pressed from above by the feed belt 54, and a size in which one of two coins in series falls into the falling hole 141. The length in a coin conveyance direction from the center of the identification counting unit 37 to the end portion on the falling hole 141 side of the outlet-side passage end portion 151 is set to, for example, 14 mm.

Moving positions of the movable wall 83 and the support portion 103 are adjusted by an interval changing mechanism 106 shown in FIG. 3. The course width adjusting knob 31 shown in FIGS. 1 and 2 is provided with a rotation position sensor 107 shown in FIG. 3, which detects the rotation position thereof. The interval changing mechanism 106 changes the distance between the pair of wall portions 63 and 64 and the distance between the pair of support portions 101 and 103 according to the rotation position of the course width adjusting knob 31, which is detected by the rotation position sensor 107.

The fixed wall 73 and the support portion 101 configure a fixed side course guide wall 131, and the movable wall 83 and the support portion 103 configure a movable side course guide wall 132. The fixed side course guide wall 131 and the movable side course guide wall 132 configure a small-diameter coin exclusion type sorting course 133 that excludes coins C having a diameter smaller than that of the designated denomination to be counted through the rejection hole 115.

Further, with respect to coins C having a diameter larger than that of the designated denomination to be counted, as shown by a two-dot chain line in FIG. 4, the inlet roller 71 configuring the inlet 91 and the guide wall 81 come into contact with the coins having a larger diameter to restrict entry of the coins from the inlet-side passage portion 61 into the conveyance passage 60. The inlet-side passage portion 61 has a retained coin detection sensor 126 provided in the vicinity of the inlet roller 71. The retained coin detection sensor 126 detects retained coins C whose entry is restricted on the inlet 91 side, and outputs the detection signal to the control unit 15.

If the rotation position of the course width adjusting knob 31 is regarded as a position corresponding to the 500-yen coin having the largest diameter, among the coins of the denominations to be counted, the control unit 15 sets the distance between the wall surface 72 of the fixed wall 73 and the wall surface 82 of the movable wall 83 and the distance between the facing tip surfaces of the pair of support portions 101 and 103 to be a predetermined 500-yen coin counting distance by the interval changing mechanism 106. The 500-yen coin counting distance is a distance causing a 500-yen coin to be supported by the pair of support portions 101 and 103 without falling into the rejection hole 115, and causing a 10-yen coin smaller than the 500-yen coin to fall into the rejection hole 115. At this time, the distance between the wall surface 72 and the wall surface 82 becomes slightly larger than the diameter of the 500-yen coin. At this time, the width of the inlet 91, which is equal to the distance between the wall surfaces 72 and 82, also becomes slightly larger than the diameter of the 500-yen coin, which is the largest-diameter coin of the denomination to be counted.

In this way, the coin processing device supports the 500-yen coin, which is the largest-diameter coin among the denominations to be counted, with the pair of support portions 101 and 103, while the 10-yen coin, the 100-yen coin, the 5-yen coin, the 50-yen coin, the 1-yen coin, and the like having a smaller diameter the 500-yen coin are caused to fall into the rejection hole 115. That is, at this time, the interval between the fixed side course guide wall 131 and the movable side course guide wall 132 becomes a predetermined 500-yen coin counting interval corresponding to the counting of the 500-yen coins to cause the smaller-diameter coins to fall into the rejection hole 115 without causing the 500-yen coins to fall into the rejection hole 115. In this state, with respect to the coins other than a counting target, which have a larger diameter than the 500-yen coins, the inlet roller 71 configuring the inlet 91 and the guide wall 81 come into contact with the coins to restrict the movement thereof in the direction away from the rotating disk 14, in other words, the entry thereof between the fixed side course guide wall 131 and the movable side course guide wall 132.

If the rotation position of the course width adjusting knob 31 is regarded as the position of the 10-yen coin as the coin of the denomination to be counted, the control unit 15 sets the distance between the wall surface 72 of the fixed wall 73 and the wall surface 82 of the movable wall 83 and the distance between the tip surfaces of the pair of support portions 101 and 103 to be a predetermined 10-yen coin counting distance. The predetermined 10-yen coin counting distance is a distance causing the 10-yen coin to be supported by the pair of support portions 101 and 103 without falling into the rejection hole 115, and causing the 100-yen coin having a smaller diameter than the 10-yen coin to fall into the rejection hole 115. That is, at this time, the interval between the fixed side course guide wall 131 and the movable side course guide wall 132 becomes a predetermined 10-yen coin counting interval corresponding to the counting of the 10-yen coins to cause the coins having a smaller diameter than the 10-yen coins to fall into the rejection hole 115 without causing the 10-yen coins to fall into the rejection hole 115. In this state, with respect to the 500-yen coins or the like having a larger diameter than the 10-yen coins, the inlet roller 71 configuring the inlet 91 and the guide wall 81 come into contact with the coins to restrict the movement thereof in the direction away from the rotating disk 14.

If the rotation position of the course width adjusting knob 31 is regarded as the position of the 100-yen coin as the coin of the denomination to be counted, the control unit 15 sets the distance between the wall surface 72 of the fixed wall 73 and the wall surface 82 of the movable wall 83 and the distance between the tip surfaces of the pair of support portions 101 and 103 to be a predetermined 100-yen coin counting distance. The predetermined 100-yen coin counting distance is a distance causing the 100-yen coin to be supported by the pair of support portions 101 and 103 without falling into the rejection hole 115, and causing the 5-yen coin having a smaller diameter than the 100-yen coin to fall into the rejection hole 115. That is, at this time, the interval between the fixed side course guide wall 131 and the movable side course guide wall 132 becomes a predetermined 100-yen coin counting interval corresponding to the counting of the 100-yen coins to cause the coins having a smaller diameter than the 100-yen coins to fall into the rejection hole 115 without causing the 100-yen coins to fall into the rejection hole 115. In this state, with respect to the 500-yen coins, the 10-yen coins, and the like having a larger diameter than the 100-yen coin, the inlet roller 71 configuring the inlet 91 and the guide wall 81 come into contact with these coins to restrict the movement thereof in the direction away from the rotating disk 14.

If the rotation position of the course width adjusting knob 31 is regarded as the position of the 5-yen coin as the coin of the denomination to be counted, the control unit 15 sets the distance between the wall surface 72 of the fixed wall 73 and the wall surface 82 of the movable wall 83 and the distance between the tip surfaces of the pair of support portions 101 and 103 to be a predetermined 5-yen coin counting distance. The predetermined 5-yen coin counting distance is a distance causing the 5-yen coin to be supported by the pair of support portions 101 and 103 without falling into the rejection hole 115, and causing the 50-yen coin having a smaller diameter than the 5-yen coin to fall into the rejection hole 115. That is, at this time, the interval between the fixed side course guide wall 131 and the movable side course guide wall 132 becomes a predetermined 5-yen coin counting interval corresponding to the counting of the 5-yen coins to cause the coins having a smaller diameter than the 5-yen coins to fall into the rejection hole 115 without causing the 5-yen coins to fall into the rejection hole 115. In this state, with respect to the 500-yen coin, the 10-yen coin, the 100-yen coin, and the like having a larger diameter than the 5-yen coin, the inlet roller 71 configuring the inlet 91 and the guide wall 81 come into contact with these coins to restrict the movement thereof in the direction away from the rotating disk 14.

If the rotation position of the course width adjusting knob 31 is regarded as the position of the 50-yen coin as the coin of the denomination to be counted, the control unit 15 sets the distance between the wall surface 72 of the fixed wall 73 and the wall surface 82 of the movable wall 83 and the distance between the tip surfaces of the pair of support portions 101 and 103 to be a predetermined 50-yen coin counting distance. The predetermined 50-yen coin counting distance is a distance causing the 50-yen coin to be supported by the pair of support portions 101 and 103 without falling into the rejection hole 115, and causing the 1-yen coin having a smaller diameter than the 50-yen coin to fall into the rejection hole 115. That is, at this time, the interval between the fixed side course guide wall 131 and the movable side course guide wall 132 becomes a predetermined 50-yen coin counting interval corresponding to the counting of the 50-yen coins to cause the coins having a smaller diameter than the 50-yen coins to fall into the rejection hole 115 without causing the 50-yen coins to fall into the rejection hole 115. In this state, with respect to the 500-yen coin, the 10-yen coin, the 100-yen coin, the 5-yen coin, and the like having a larger diameter than the 50-yen coin, the inlet roller 71 configuring the inlet 91 and the guide wall 81 come into contact with these coins to restrict the movement thereof in the direction away from the rotating disk 14.

If the rotation position of the course width adjusting knob 31 is regarded as the position of the 1-yen coin as the coin of the denomination to be counted, the control unit 15 sets the distance between the wall surface 72 of the fixed wall 73 and the wall surface 82 of the movable wall 83 and the distance between the tip surfaces of the pair of support portions 101 and 103 to be a predetermined 1-yen coin counting distance. The predetermined 1-yen coin counting distance is a distance causing the 1-yen coin to be supported by the pair of support portions 101 and 103 without falling into the rejection hole 115, and causing the coins having a smaller diameter than the 1-yen coin to fall into the rejection hole 115. That is, the interval between the fixed side course guide wall 131 and the movable side course guide wall 132 becomes a predetermined 1-yen coin counting interval corresponding to the counting of the 1-yen coins to cause the coins having a smaller diameter than the 1-yen coins to fall into the rejection hole 115 without causing the 1-yen coins to fall into the rejection hole 115. In this state, with respect to the 500-yen coin, the 10-yen coin, the 100-yen coin, the 5-yen coin, the 50-yen coin, and the like having a larger diameter than the 1-yen coin, the inlet roller 71 configuring the inlet 91 and the guide wall 81 come into contact with these coins to restrict the movement thereof in the direction away from the rotating disk 14.

As shown in FIG. 3, the feeding motor 16, the operation display unit 30, the identification counting unit 37, the conveyance motor 57, the residual detection sensor 17, the interval changing mechanism 106, the rotation position sensor 107, and the retained coin detection sensor 126 are communicably connected to the control unit 15.

As shown in FIG. 4, in the coin processing device 11 of the present embodiment, a stopper mechanism that comes into contact with the coins C from the front in the conveyance direction at the time of the conveyance of the coins C toward the falling hole 141, thereby restricting falling of the coins C into the falling hole 141 and keeping the coins C on the outlet-side passage portion 112, is not provided at the outlet-side passage portion 112 that includes the outlet-side passage end portion 151. Further, a stopper mechanism that comes into contact with the coins C from the front in the conveyance direction at the time of the conveyance of the coins C toward the rotating disk 14, thereby restricting the movement of the coins C to the rotating disk 14 and keeping the coins C on the outlet-side passage portion 112, is also not provided at the outlet-side passage portion 112. In the coin processing device 11 of the present embodiment, as a method of stopping the coins C that are conveyed by the coin conveyance unit 128 without providing such a stopper mechanism, a method of stopping the coins by speed control of the conveyance motor 57, which is a stepping motor, is adopted.

As described above, the conveyance drive unit 35 that includes the feed belt 54 comes into contact with the coins C separated from the rotating disk 14 one by one by the sorting ring 34 and fed onto the inlet-side passage portion 61 on the upper side, thereby conveying the coins C on the conveyance passage 60 from the inlet 91 side of the pair of wall portions 63 and 64 toward the rejection hole 115. If the coins C which are being conveyed do not fall at the rejection hole 115, the conveyance drive unit 35 further conveys the coins C toward the outlet-side passage portion 112 and finally conveys the coins C to the falling hole 141.

In the feed belt 54 and the conveyance motor 57 that drives the feed belt 54, as described above, the rotation direction for conveying the coins C from the inlet-side passage portion 61 to the outlet-side passage portion 112 on the conveyance passage 60, in other words, from the rotating disk 14 side toward the falling hole 141 side, is set to be normal rotation. On the other hand, the rotation direction for conveying the coins C from the outlet-side passage portion 112 toward the inlet-side passage portion 61 on the conveyance passage 60 in the direction opposite to the normal rotation is set to be reverse rotation. The feed belt 54 comes into contact with the coins C on the upper side and normally rotates to convey the coins C from the inlet-side passage portion 61 toward the outlet-side passage portion 112. At this time, the conveyance motor 57 normally rotates the feed belt 54 at the time of normal rotation. Further, the feed belt 54 comes into contact with the coins C on the upper side and reversely rotates to convey the coins C from the outlet-side passage portion 112 toward the inlet-side passage portion 61. At this time, the conveyance motor 57 reversely rotates the feed belt 54 at the time of reverse rotation. The upstream side in the conveyance direction at the time of the normal rotation of the feed belt 54 is defined as the upstream side at the time of normal rotation, and the downstream side in the conveyance direction at the time of the normal rotation of the feed belt 54 is defined as the downstream side at the time of normal rotation. The inlet-side passage portion 61 is disposed on the upstream side at the time of normal rotation with respect to the outlet-side passage portion 112. On the other hand, the outlet-side passage portion 112 is disposed on the downstream side at the time of normal rotation with respect to the inlet-side passage portion 61.

In the rotating disk 14 and the feeding motor 16 that drives the rotating disk 14, the rotation direction of feeding the coins C from the rotating disk 14 toward the inlet-side passage portion 61 is set to be normal rotation. The rotation direction in which the coins C which are returned from the inlet-side passage portion 61 in the direction opposite to the normal rotation are received in the rotating disk 14 is set to be reverse rotation.

Next, the processing of the coin processing device 11 will be described with reference to the flowcharts shown in FIGS. 5 to 9. Here, batch processing will be described in which the coins C of the denomination set in advance, among the coins C input in the hopper 12, are discharged from the chute 19 by the number of coins set in advance, and stored in the storage bag (not shown) mounted to the chute 19.

The operator selects the denomination to be counted (for example, the 500-yen coin) on the operation display unit 30. The operator inputs the number of coins (for example, 100 coins) to be processed in this batch processing on the operation display unit 30. Further, the operator sets the rotation position of the knob 31 to the position of the denomination to be counted (for example, the 500-yen coin) with the course width adjusting knob 31. If such a setting is made, the control unit 15 controls the interval changing mechanism 106 to give a feeling according to the denomination to be counted. That is, the control unit 15 makes the fixed side course guide wall 131 and the movable side course guide wall 132 have the interval (for example, the 500-yen coin counting interval) for causing coins having a diameter smaller than that of the denomination to be counted to fall into the rejection hole 115 without causing the coins of the denomination to be counted to fall into the rejection hole 115. At the same time, the control unit 15 causes the operation display unit 30 to display a display prompting input of the coins C of the denomination to be counted into the hopper 12.

If the operator inputs the coins C into the hopper 12, the residual detection sensor 17 detects the input of the coins C. Then, the control unit 15 causes the operation display unit 30 to display a display prompting a start operation. If the start operation is input to the operation display unit 30 by the operator, the control unit 15 outputs an instruction signal instructing the feeding motor 16 and the conveyance motor 57 to normally rotate at a normal speed. At the same time, the control unit 15 starts timing of a waiting time for arrival of a subsequent coin (step S101). In this way, the rotating disk 14 and the feed belt 54 enter the usual normal rotation state where they normally rotate at the normal speed.

Then, the coins in the hopper 12 are fed toward the space between the wall surface 72 of the fixed wall 73 and the wall surface 82 of the movable wall 83 on the upper surface 62 of the inlet-side passage portion 61 of the conveyance passage 60 while being separated one by one by the sorting ring 34 due to the centrifugal force of the rotating disk 14 that normally rotates at the normal speed.

Next, the feed belt 54, which normally rotates at the normal speed, comes into contact with the coins C fed onto the upper surface 62 of the inlet-side passage portion 61 from the upper side to move the coins C along the conveyance passage 60. At that time, the coins C having a larger diameter than the coins C of the denomination to be counted come into contact with the inlet roller 71 configuring the inlet 91 and the guide wall 81, and thus the movement thereof to the downstream side at the time of normal rotation is restricted. Further, the coins C of the denomination to be counted and a fake coin C having almost the same diameter as the coins C move downstream while the outer peripheral surfaces thereof are guided by the wall surface 72 of the fixed wall 73 and the wall surface 82 of the movable wall 83. At this time, the lower surfaces of the coins C move from the upper surface 62 of the inlet-side passage portion 61 to the downstream side at the time of normal rotation on the upper surfaces 102 and 104 of the pair of support portions 101 and 103 and further on the upper surface 111 of the outlet-side passage portion 112. Then, the coins C of the denomination to be counted and the fake coin C having almost the same diameter as the coins C move on the conveyance passage 60 to the downstream side at the time of normal rotation at the normal speed integrally with the lower side portion of the feed belt 54 that normally rotates at the normal speed. Further, the coins C having a smaller diameter than the coins C of the denomination to be counted fall from the rejection hole 115, are discharged from the discharge port 25 through a rejection chute (not shown), and are accommodated in the exclusion box 26.

In this way, the feed belt 54 and the conveyance passage 60 convey the coins C of the denomination to be counted and the fake coin C having almost the same diameter as the coins C from the inlet-side passage portion 61 side toward the outlet-side passage portion 112 side. In other words, the coins C of the denomination to be counted and the fake coin C having almost the same diameter as the coins C are supported by the inlet-side passage portion 61, the pair of support portions 101 and 103, and the outlet-side passage portion 112 of the conveyance passage 60 and moved by the driving of the feed belt 54. At that time, the pair of wall portions 63 and 64 guide the outer peripheral surfaces of the coins C, and the pair of support portions 101 and 103 support the outer periphery sides of the lower surfaces of the coins C.

The coins C of the denomination to be counted and the fake coin C having almost the same diameter as the coins C are conveyed by the feed belt 54 which is in the usual normal rotation state where it normally rotates at the normal speed, as described above, and move to the downstream side at the time of normal rotation on the upper surface 111 of the outlet-side passage portion 112 at the normal speed. During this movement, the coins C and the fake coin C pass through the identification counting unit 37 which is a magnetic sensor provided at the outlet-side passage portion 112. Here, the identification counting unit 37 measures the magnetism of the coins C which have passed through it, and determines whether or not a peak value of the obtained magnetic data is detected (step S102). If the identification counting unit 37 detects the peak value of the magnetic data (step S102: YES), the control unit 15 determines that the identification counting unit 37 has detected a coin C. At the point in time of this determination, the coin C is located at a predetermined position facing the identification counting unit 37 in the conveyance direction.

In step S102, if the identification counting unit 37 detects the coin C, the control unit 15 compares the peak value of the magnetic data thereof with the master data stored in advance, and identifies whether or not the coin C is a coin of the denomination to be counted (step S103).

[In a Case where the Coin is a Coin of the Denomination to be Counted]

In a case where the coin C detected in step S102 is identified as a coin of the denomination to be counted (step S103: YES), the control unit 15 increments a counting counter by 1, as the counting value of the coins C in this batch processing. At the same time, the control unit 15 retimes the waiting time for arrival of a subsequent coin from 0 (step S104). Next, the control unit 15 subtracts the counting value of the counting counter from the number of coins to be processed (for example, 100 coins) set in this batch processing to calculate the number of remaining coins to be processed (the number of remaining batch coins). The control unit 15 determines whether or not the number of coins C has reached the number of coins to be processed in the batch processing, that is, whether or not the number of remaining batch coins is 0, and determines whether or not a stop operation has been input to the operation display unit 30 (step S105). If the number of remaining batch coins is not 0 and the stop operation has not been input to the operation display unit 30 (step S105: NO), the processing returns to step S102. The coin C identified as a coin of the denomination to be counted in step S103 is conveyed by the feed belt 54 that normally rotates at the normal speed to move to the outlet-side passage end portion 151, falls from the falling hole 141, and is discharged from the chute 19 through an internal chute (not shown).

By repeating the processing shown in steps S102 to S105, a number the coins C of the denomination to be counted set at the time of start of this batch processing can be caused to sequentially fall into the falling holes 141 and collected in the storage bag (not shown) mounted to the chute 19.

In the determination of step S102, if the identification counting unit 37 does not detect the peak value of the magnetic data, in other words, if the identification counting unit 37 does not detect the coin C (step S102: NO), the control unit 15 determines whether or not a predetermined waiting time has elapsed within the waiting time for arrival of the subsequent coin whose timing has been started in step S101 or the waiting time for arrival of the subsequent coin whose timing has been restarted in step S104 (step S401). If the predetermined waiting time has not elapsed within the waiting time for arrival of the subsequent coin (step S401: NO), the processing returns to step S102. If the predetermined waiting time has elapsed within the waiting time for arrival of the subsequent coin (step S401: YES), the control unit 15 outputs an instruction signal instructing the feeding motor 16 and the conveyance motor 57 to stop (step S402). In this way, the rotating disk 14 and the feed belt 54 stop. Then, the batch processing is ended. That is, in a case where there are no more coins C to be counted during the batch processing, even if the coins C caused to fall into the falling hole 141 do not reach the number of coins to be processed in the batch processing, the batch processing is forcibly ended and the rotating disk 14 and the feed belt 54 are stopped.

By repeating the processes of steps S102 to S105, as described above, the coins C of the denomination to be counted are caused to sequentially fall into the falling hole 141. If the peak value is detected in step S102, the coin is identified as a coin of the denomination to be counted in step S103, the counting value of the counting counter becomes the number of coins to be processed in this batch processing due to the coins C whose counting counter is incremented by 1 in step S104, and the number of remaining batch coins becomes 0 (step S105: YES), the coin C becomes the last coin C (for example, the 100th coin) in the batch processing.

If the number of remaining batch coins becomes 0 (step S105: YES), the control unit 15 outputs an instruction signal instructing the conveyance motor 57 to normally rotate at a first slow speed slower than the normal speed. At the same time, the control unit 15 outputs an instruction signal instructing the feeding motor 16 to stop (step S106). Even in a case where it is determined in step S105 that the stop operation has been input to the operation display unit 30, the control unit 15 performs the same control as in a case where the number of remaining batch coins becomes 0.

In step S106, the control unit 15 outputs an instruction signal instructing the feeding motor 16 to stop, whereby the rotating disk 14 stops. At the same time, the conveyance motor 57 is switched from the usual normal rotation state where the conveyance motor 57 normally rotates at the normal speed to the first slow normal rotation state where the conveyance motor 57 normally rotates at the first slow speed. According to this, the feed belt 54 also normally rotates at the first slow speed slower than the normal speed until then. The conveyance motor 57 is switched to the first slow speed, whereby the last coin C of the number of coins to be processed in a state where the number of remaining batch coins is 0 in step S105 moves to the downstream side at the time of normal rotation at the outlet-side passage end portion 151 at the first slow speed slower than the normal speed, and falls into the falling hole 141.

More specifically, the normal speed described above is prepared in two types: a high-speed mode and a low-speed mode, according to the counting speed selection of the operator. The design value of the high-speed mode is 1318 mm/s, and the design value of the low-speed mode is 1040 mm/s. With respect to these normal speeds, the first slow speed is set to a speed in consideration of a margin for lowering the speed, and the design value is 452 mm/s. That is, when a large-diameter coin with a large mass (specifically, the 500-yen coin) is being conveyed at the normal speed, even if the stop operation is performed with the detection by the identification counting unit 37 as a trigger, the stop position of the coin C moves in the conveyance direction due to inertia. As a result, the coin C cannot stay on the outlet-side passage end portion 151, and there is a possibility that the coin C may erroneously fall into the falling hole 141 on the downstream side. In order to solve this, it is necessary to start the deceleration control of the conveyance motor 57 in stages, and as described above, the feed belt 54 is controlled to normally rotate at the first slow speed slower than the normal speed.

Figure 6:
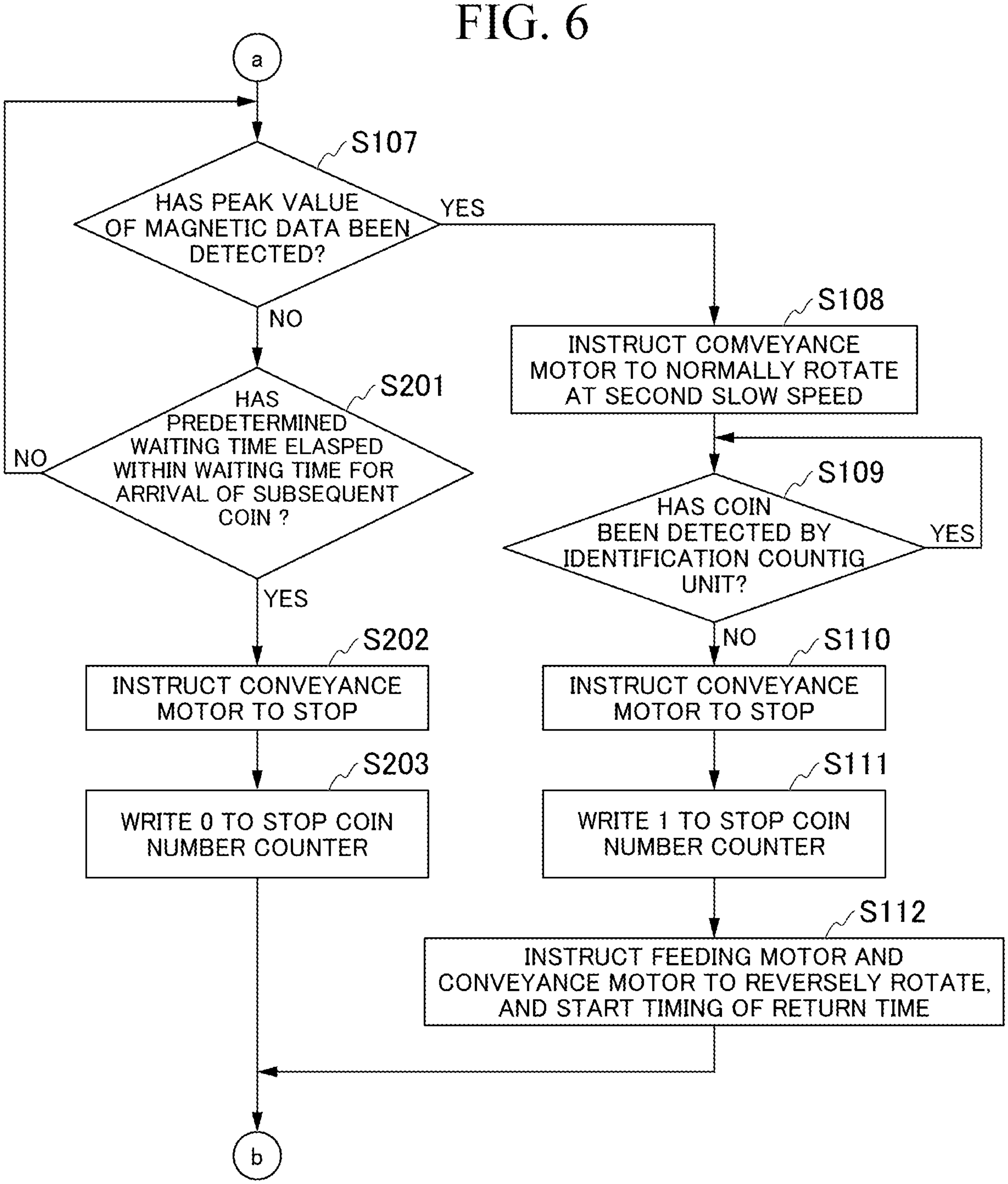
FIG. 6 is a flowchart showing a part of the batch processing that is executed by the coin processing device according to the embodiment of the present invention.
Figure 7:
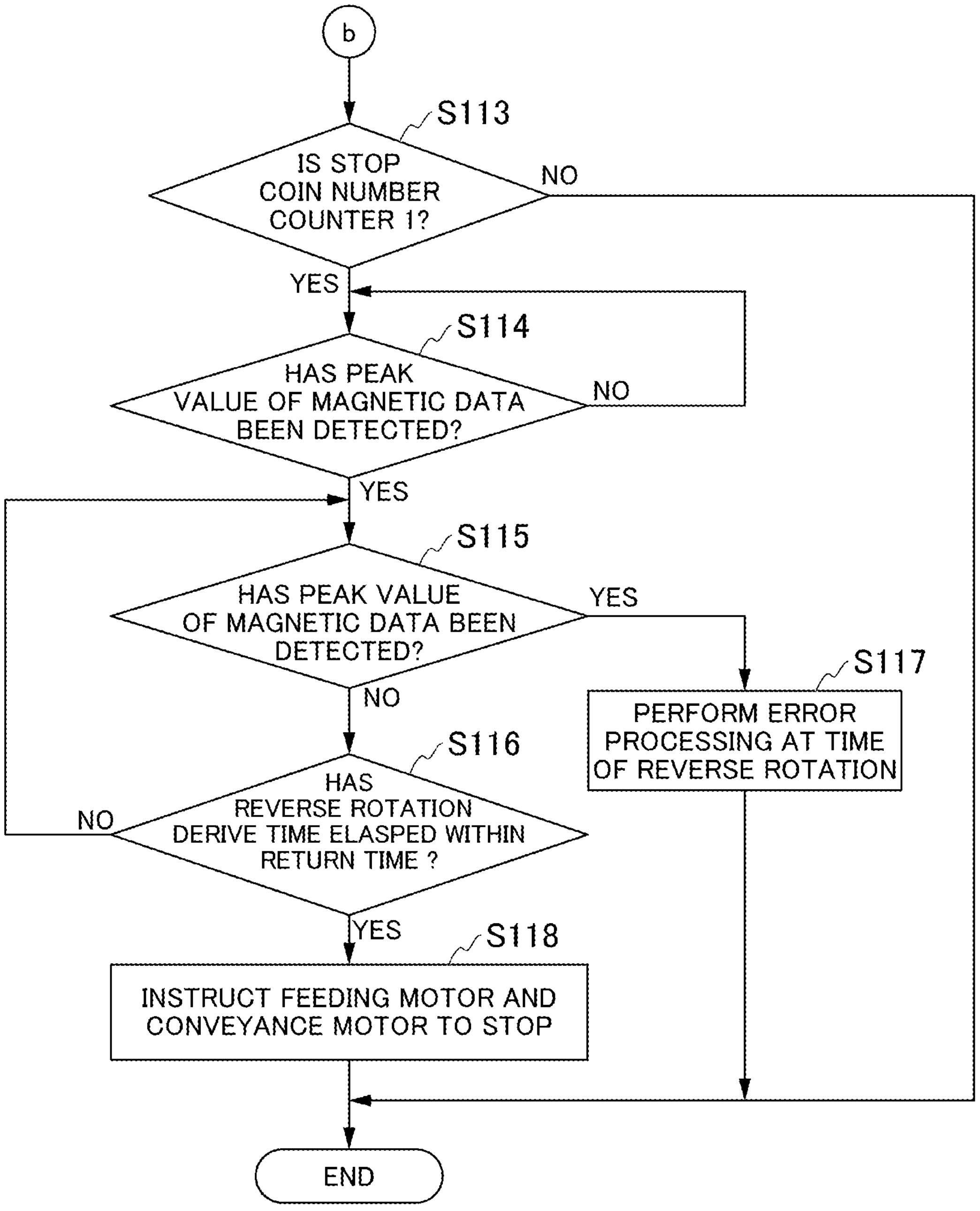
FIG. 7 is a flowchart showing a part of the batch processing that is executed by the coin processing device according to the embodiment of the present invention.
Figure 8:
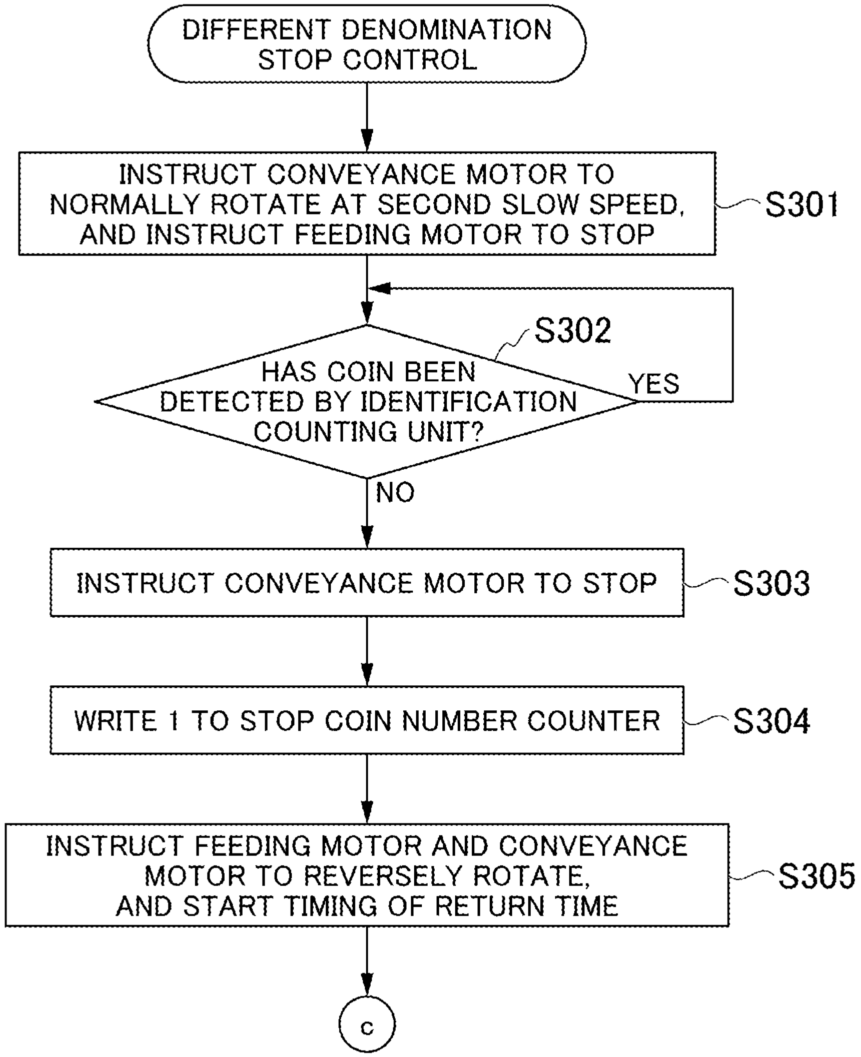
FIG. 8 is a flowchart showing a part of the batch processing that is executed by the coin processing device according to the embodiment of the present invention.
Figure 9:
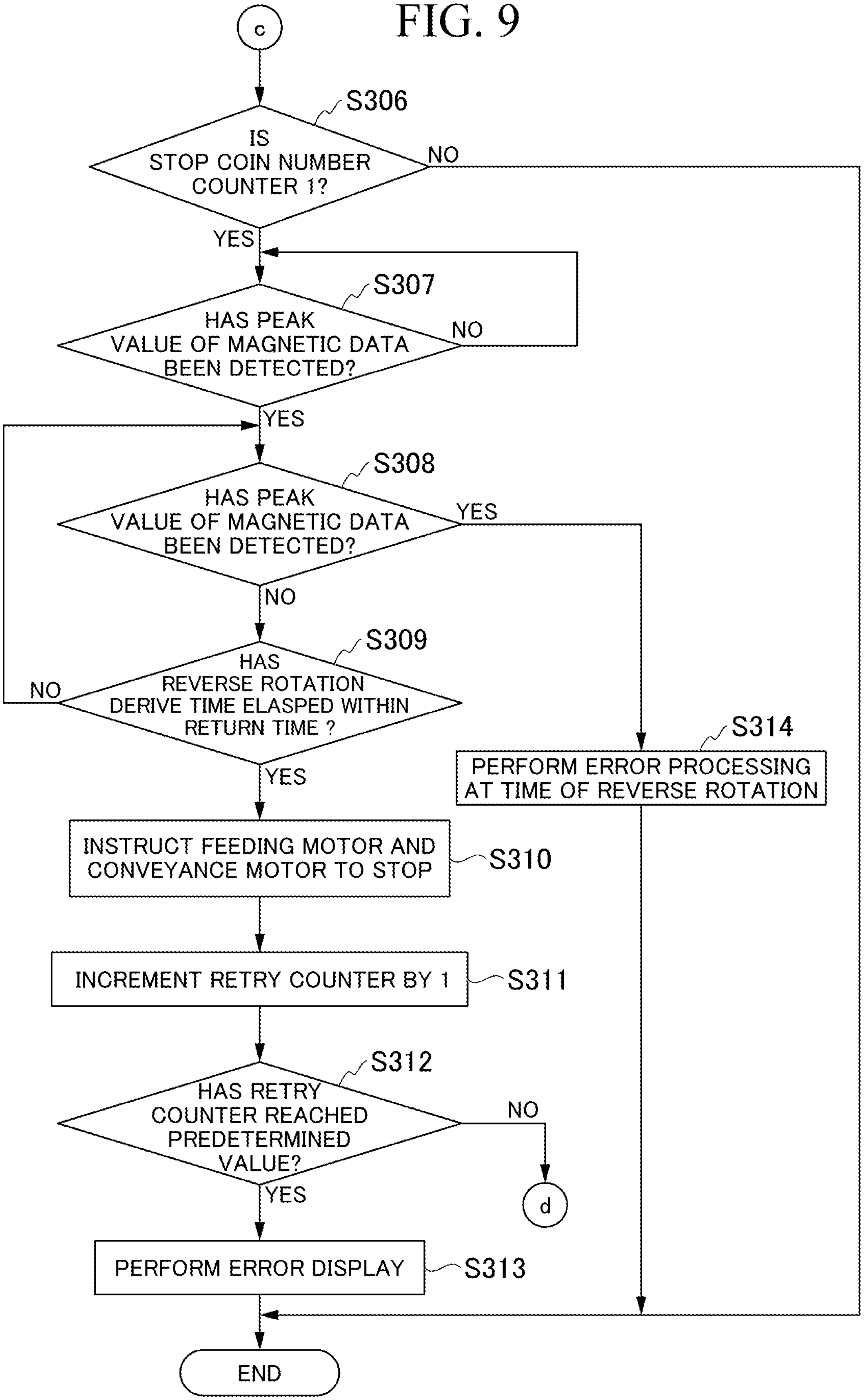
FIG. 9 is a flowchart showing a part of the batch processing that is executed by the coin processing device according to the embodiment of the present invention.

Even after the last coin C to be processed in this batch processing is detected, the identification counting unit 37 detects magnetism, thereby determining whether or not the peak value of the magnetic data is detected (step S107 in FIG. 6).

{In a Case where there is a Subsequent Coin on the Upstream Side at the Time of Normal Rotation of the Last Coin in the Batch Processing}

In FIG. 6, in the determination in step S107, if the identification counting unit 37 detects the peak value of the magnetic data (step S107: YES), the control unit 15 determines that the identification counting unit 37 has detected the coin C to be stopped (for example, the 101st coin), which is a target to be stopped, following the last coin C (for example, the 100th coin) that is processed in this batch processing. At the point in time of this determination, the coin C to be stopped is located at a position facing the identification counting unit 37 in the conveyance direction.

If the peak value of the magnetic data of the coin C to be stopped is detected (step S107: YES), the control unit 15 outputs an instruction signal instructing the conveyance motor 57 to normally rotate at the second slow speed slower than the first slow speed (step S108).

In this way, the conveyance motor 57 is switched from the first slow normal rotation state where the conveyance motor 57 normally rotates at the first slow speed to the second slow normal rotation state where the conveyance motor 57 normally rotates at the second slow speed slower than the first slow speed. According to this, the feed belt 54 normally rotates at the second slow speed slower than the first slow speed. At this time, the rotating disk 14 is maintained in the stopped state. If the feed belt 54 rotates at the second slow speed, the coin C to be stopped, which is adjacent to and follows the last coin C to be processed in this batch processing, moves to the downstream side at the time of normal rotation at the outlet-side passage end portion 151 at the second slow speed slower than the first slow speed. In this manner, the control unit 15 switches the conveyance motor 57 that normally rotates from the first slow normal rotation state to the second slow normal rotation state having the second slow speed slower than the speed of the first slow normal rotation state, in response to the detection of the identification counting unit 37, and then rotates the conveyance motor 57.

Here, the second slow speed of the conveyance motor 57 is a speed at which the coin C can be stopped immediately after the conveyance motor 57 receives an instruction signal instructing it to stop, thereafter, and, for example, 339 mm/s is set as a design value thereof.

After the control unit 15 outputs an instruction signal for normal rotation at the second slow speed to the conveyance motor 57, the control unit 15 determines whether or not the identification counting unit 37 has detected the coin C to be stopped, which is adjacent to and follows the last coin C to be processed in this batch processing, according to the detection of the magnetic data thereof (step S109). In this determination, if the identification counting unit 37 is in a detection state where it detects the magnetic data at a level equal to or higher than a predetermined value, thus detecting the coin C to be stopped (step S109: YES), the control unit 15 performs waiting by repeating step S109 until a non-detection state is created where the magnetic data detected by the identification counting unit 37 reaches a level lower than the predetermined value, and thus the coin C to be stopped is not detected.

If the identification counting unit 37 does not detect the magnetic data of the coin C to be stopped at a level equal to or higher than the predetermined value, and thus the non-detection state is created where the coin C is not detected (step S109: NO), the coin C to be stopped passes through the identification counting unit 37. That is, at the point in time when the coin C to be stopped is changed from the detection state to the non-detection state, the coin C to be stopped does not face the identification counting unit 37, does not fall into the falling hole 141, and is located at a predetermined position on the outlet-side passage end portion 151.

As described above, if the identification counting unit 37 does not detect the coin C to be stopped (step S109: NO), the control unit 15 outputs an instruction signal instructing the conveyance motor 57 to stop (step S110). In this way, the feed belt 54 which has been normally rotated at the second slow speed until then stops immediately. Even at this time, the rotating disk 14 is maintained in the stopped state. If the feed belt 54 stops, the coin C to be stopped, which has been detected in step S107, stops on the outlet-side passage end portion 151. If the feed belt 54 stops, only one coin C to be stopped, which is adjacent to and follows the last coin C to be processed in this batch processing, is located on the outlet-side passage end portion 151.

In other words, at the point in time when, at the time of the normal rotation of the conveyance motor 57 at the second slow speed, a change from the detection state where the level of the magnetic data of the coin C detected by the identification counting unit 37 is equal to or higher than a predetermined value to the non-detection state where the level of the magnetic data is not equal to or higher than the predetermined value is made, the control unit 15 outputs an instruction signal to stop to the conveyance motor 57. Then, one coin C, which stops together with the feed belt 54, does not fall into the falling hole 141 and remains at the outlet-side passage end portion 151, and if all the coins C which have been conveyed to the falling hole 141 side ahead of the coin C are normal, they fall into the falling hole 141. The outlet-side passage end portion 151 is set to be in a dimensional relationship that satisfies such an operation with respect to the coins C of all the denominations of the coins to be processed. In this manner, even if there is a subsequent coin C adjacent to the upstream side at the time of normal rotation with respect to the coin C remaining at the outlet-side passage end portion 151 at the time of stop of the feed belt 54, the identification counting unit 37 does not detect the peak value of the magnetic data of the subsequent coin C.

Further, in other words, the second slow speed of the conveyance motor 57 is a speed at which the coin C to be stopped can stop on the outlet-side passage portion 112 on the downstream side of the identification counting unit 37 after the coin C to be stopped is detected by the identification counting unit 37.

In the flow of the processing shown in steps S101 to S106 described above, the control unit 15 switches the conveyance motor 57 from the usual normal rotation state (the third rotation state), which has a speed faster than the first slow normal rotation state (the first rotation state) where the conveyance motor 57 rotates at the first slow speed, to the first slow normal rotation state, in response to the detection by the identification counting unit 37 of the last coin C to be processed in the batch processing, which is on the downstream side at the time of normal rotation by one coin with respect to one coin C to be stopped.

Further, in the flow of the processing shown in steps S107 to S110 described above, the control unit 15 switches the conveyance motor 57 from the first slow normal rotation state (the first rotation state) where the conveyance motor 57 rotates at the first slow speed to the second slow normal rotation state (the second rotation state) where the conveyance motor 57 rotates at the second slow speed, in response to the detection by the identification counting unit 37 of one coin C to be stopped, which has been conveyed next to the last coin C to be processed in the batch processing. Thereafter, the control unit 15 performs stop control for stopping the conveyance motor 57, in response to the change from the detection state of one coin C to be stopped by the identification counting unit 37 to the non-detection state.

Due to this stop control, the control unit 15 stops only one coin C to be stopped on the outlet-side passage end portion 151 which is on the downstream side at the time of normal rotation with respect to the identification counting unit 37 in the outlet-side passage portion 112. Here, the outlet-side passage end portion 151 has a size in which one coin C of the coins of all the denominations of the coins to be processed can be placed (can remain) and two or more coins cannot be placed (cannot remain). Therefore, in this stop control, the last coin C to be processed in the batch processing, which is adjacent to the downstream side at the time of normal rotation of one coin C to be stopped, and all the previous coins C before it are caused to fall into the falling hole 141.

The first slow normal rotation state switched from the usual normal rotation state in step S106 is continued as it is until it is switched to the second slow normal rotation state in step S108 thereafter. Further, the second slow normal rotation state switched from the first slow normal rotation state in step S108 is continued as it is until it is switched to the stopped state in step S110 thereafter.

The control unit 15 outputs the instruction signal instructing the conveyance motor 57 to stop, in step S110, and then writes 1 to a stop coin number counter (step S111). Here, in the stop coin number counter, the number of coins C that have to pass through the identification counting unit 37 at the time of reverse rotation conveyance to be performed from now on is set. That is, one is set as the number of coins C that have to pass through the identification counting unit 37 at the time of the reverse rotation conveyance.

Next, the control unit 15 outputs an instruction signal instructing the feeding motor 16 and the conveyance motor 57 to reversely rotate, and starts timing of a return time (step S112). Then, a reverse rotation state is created where both the rotating disk 14 and the feed belt 54 reversely rotate.

Thereafter, the control unit 15 determines whether or not the stop coin number counter is 1 (step S113), and in a case where the stop coin number counter is 1 (step S113: YES), that is, in a case where there is a coin C following the last coin C to be processed in the batch processing, the identification counting unit 37 determines whether or not the peak value of the magnetic data has been detected (step S114). In the determination in step S114, if the peak value of the magnetic data is not detected (step S114: NO), waiting is performed by repeating step S114. Here, if the coin C whose peak value is detected in step S114 is normal, as described above, only one coin C which was a target to be stopped remains on the outlet-side passage end portion 151.

In the determination in step S114, if the peak value of the magnetic data is detected (step S114: YES), the control unit 15 again determines whether or not the identification counting unit 37 has detected the peak value of the magnetic data (step S115). The identification counting unit 37 usually detects only the peak value of the magnetic data of one coin C which was a target to be stopped, as described above, and therefore, in step S115, the peak value of the magnetic data is not detected. That is, step S114 and step S115 are processing for confirming that only one coin C has passed through the identification counting unit 37.

In step S114, the determination for detecting the coin C is performed according to whether or not the identification counting unit 37 detects the peak value of the magnetic data. This determination may be performed according to whether or not the identification counting unit 37 detects a level equal to or higher than a predetermined threshold value of the magnetic data. That is, the state where the identification counting unit 37 detects that the magnetic data is at a level equal to or higher than the predetermined threshold value may be defined as the detection state of the coin C, and the state where the identification counting unit 37 detects that the magnetic data is at a level lower than the threshold value may be defined as the non-detection state of the coin C. If the identification counting unit 37 detects that one coin C which was a target to be stopped has been changed from the detection state to the non-detection state, the control unit 15 may determine that the coin C has passed through the identification counting unit 37 at the time of the reverse rotation conveyance. Further, the same applies to the determination in step S115.

In step S115, if the identification counting unit 37 does not detect the peak value of the magnetic data (step S115: NO), whether or not a predetermined reverse rotation drive time required for returning all the coins C remaining on the conveyance passage 60 to the rotating disk 14 has elapsed within the return time whose timing has been started in step S112 is determined (step S116). The design value of the reverse rotation drive time is set to, for example, 200 ms.

If by the reverse rotation drive time has not elapsed within the return time (step S116: NO), the processing returns to step S115. Step S115 and step S116 are repeated until the reverse rotation drive time elapses within the return time. If the reverse rotation drive time elapses within the return time (step S116: YES), the control unit 15 outputs an instruction signal instructing the feeding motor 16 and the conveyance motor 57 to stop (step S118), and ends the batch processing.

In this way, the rotating disk 14 stops and the feed belt 54 stops. In this manner, the rotating disk 14 and the feed belt 54 are set to be in the reverse rotation state until the reverse rotation drive time elapses within the return time. In this way, with the processing of steps S101 to S110 in which the number to be batch-processed of coins C of the denomination to be counted are discharged to the chute 19, all the coins C fed from the rotating disk 14 to the conveyance passage 60 which exceed the number of coins to be batch-processed can be returned to the rotating disk 14.

As described above, one coin C which was a target to be stopped, which has been conveyed next to the last coin C to be batch-processed, is returned to the rotating disk 14 at the end of this processing.

As described above, by the reverse rotation conveyance after the stop control, all the coins C on the conveyance passage 60 are finally returned to the hopper 12. During this period, the number of coins C detected by the identification counting unit 37 is only the 101st coin C. That is, this is because the number of coins C that pass through the identification counting unit 37, temporarily stop on the outlet-side passage end portion 151 (for example, a total length of 14 mm), are then reversely conveyed by the reverse rotation of the conveyance motor 57, and pass through the identification counting unit 37 again is only the one that can stay on the outlet-side passage end portion 151. With the conveyance of the 101st coin, the control unit 15 determines that all the coins C up to the 100th coin have fallen into the falling hole 141 located on the downstream side at the time of normal rotation from the outlet-side passage end portion 151 and been conveyed to the chute 19 through an internal chute (not shown).

In the determination in step S115, if the identification counting unit 37 detects the peak value of the magnetic data that cannot be originally detected (step S115: YES), the control unit 15 determines that the last coin C to be processed in the batch processing has been returned to the outlet-side passage portion 112, and stops the feeding motor 16 and the conveyance motor 57. Further, the control unit 15 performs error processing at the time of reverse rotation for performing error display indicating that the last coin C to be processed in the batch processing has been returned on the operation display unit 30 (step S117), and ends the batch processing.

That is, in a case where the identification counting unit 37 detects two or more coins at the time of reverse rotation conveyance, it is an unforeseen situation and a situation occurs in which the last coin C to be processed in the batch processing, which has to fall into the falling hole 141, has been returned onto the conveyance passage 60. As a cause, for example, a state is assumed where the 100th coin C, which is the last coin to be processed in the batch processing, and the 101st coin C which was a target to be stopped are connected to each other by tape or the like. At this time, the control unit 15 causes the occurrence of an error to be displayed on the operation display unit 30 and also performs a notification by a buzzer or the like. In this way, the operator is urged to perform confirmation and removal of the coin.

In the flow of the processing shown in steps S111 to S118 described above, after the stop control described above is performed, the control unit 15 reversely rotates the conveyance motor 57 to perform switching to the reverse conveyance of the coin C toward the upstream side at the time of normal rotation opposite to the downstream side at the time of normal rotation. Thereafter, the control unit 15 confirms that one coin C to be stopped has been detected by the identification counting unit 37. If only one coin C to be stopped is detected by the identification counting unit 37, since the control unit 15 can determine that all the coins C conveyed in the direction of the downstream side at the time of normal rotation ahead of one coin C to be stopped did not remain on the outlet-side passage portion 112, it is not regarded as an error.

{In a Case where there is No Subsequent Coin on the Upstream Side at the Time of Normal Rotation of the Last Coin in the Batch Processing}

In the determination in step S107, if the peak value of the magnetic data is not detected (step S107: NO), whether or not a predetermined waiting time has elapsed within the waiting time for arrival of the subsequent coin retimed in step S104 in response to the detection of the last coin C to be processed in the batch processing in step S102 is determined (step S201). Here, for the predetermined waiting time, for example, 500 ms is set as a design value. If the predetermined waiting time has not elapsed within the waiting time for arrival of the subsequent coin, the processing returns to step S107, and steps S107 and S201 are repeated. If the predetermined waiting time has elapsed within the waiting time for arrival of the subsequent coin (step S201: YES), the control unit 15 outputs an instruction signal instructing the conveyance motor 57 to stop (step S202). In this way, the feed belt 54 stops. Even at this time, the rotating disk 14 is maintained in the stopped state.

With respect to the control of the conveyance motor 57, similar to the control of the feeding motor 16, it is desirable for the time associated with the stop operation to be short (for example, 0 ms). However, due to the nature in which the stepping motor is used for the conveyance motor 57, it is necessary to perform deceleration control for preventing step-out, and since immediate stop is not possible, it is preferable for a predetermined time determined in advance to be provided between the time when it is determined that a stop has to be made and the time when an instruction signal instructing to stop is output.

In step S202, after the control unit 15 outputs the instruction signal instructing the conveyance motor 57 to stop, the control unit 15 writes 0 to the stop coin number counter (step S203). Thereafter, the processing proceeds to step S113. In step S113, since the stop coin number counter is 0 and not 1 (step S113: NO), the batch processing is ended.

[In a Case where the Coin is a Different Denomination Coin that is not a Coin of the Denomination to be Counted]

In a case where the coin C in which the peak value of the magnetic data is detected by the identification counting unit 37 in step S102 is identified as a different denomination coin that is not a coin C of the denomination to be counted (step S103: NO), in other words, in a case where it is identified as a coin C other than a falling target to be caused to fall into the falling portion 141, the control unit 15 performs different denomination stop control shown in FIGS. 8 and 9.

That is, the control unit 15 outputs an instruction signal instructing the conveyance motor 57 to normally rotate at the second slow speed slower than the previous normal speed. At the same time, the control unit 15 outputs an instruction signal instructing the feeding motor 16 to stop (step S301). That is, the control unit 15 instantly reduces the speed of the conveyance motor 57 from the normal speed to the second slow speed even slower than the first slow speed that is slower than the normal speed.

Due to step S301, the rotating disk 14 stops and the conveyance motor 57 is switched from the usual normal rotation state where the conveyance motor 57 normally rotates at the normal speed to the second slow normal rotation state where the conveyance motor 57 normally rotates at the second slow speed. According to this, the feed belt 54 rotates at the second slow speed slower than the normal speed. If the feed belt 54 rotates at the second slow speed, the different denomination coin C to be stopped, which is not identified as a coin C of the denomination to be counted in step S103, moves to the downstream side at the time of normal rotation at the outlet-side passage end portion 151 at the second slow speed slower than the normal speed. In this manner, the control unit 15 switches the conveyance motor 57 that normally rotates from the usual normal rotation state to the second slow normal rotation state having the second slow speed slower than the rotation speed in the usual normal rotation state, in response to the detection of the identification counting unit 37, and then rotates the conveyance motor 57.

After the instruction signal for the normal rotation at the second slow speed is output to the conveyance motor 57, the control unit 15 determines whether or not the identification counting unit 37 has detected the magnetic data of the different denomination coin C to be stopped (step S302). In this determination, if the identification counting unit 37 detects the magnetic data at a level equal to or higher than a predetermined value and is in a detection state where the magnetic data is detected as the different denomination coin C (step S302: YES), the control unit 15 performs waiting by repeating step S302 until a non-detection state is created where the level of the magnetic data of the identification counting unit 37 becomes less than a predetermined value, so that the different denomination coin C is not detected.

If the non-detection state where the magnetic data of the different denomination coin C to be stopped is not detected at a level equal to or higher than a predetermined value by the identification counting unit 37 is created (step S302: NO), the different denomination coin C passes through the identification counting unit 37. In other words, if the non-detection state where the different denomination coin C to be stopped is not detected by the identification counting unit 37 is created, the different denomination coin C to be stopped is located at a predetermined position on the outlet-side passage end portion 151, where it does not face the identification counting unit 37 in the conveyance direction and does not fall into the falling hole 141.

If the non-detection state where the different denomination coin C to be stopped is not detected by the identification counting unit 37 is created (step S302: NO), the control unit 15 outputs an instruction signal instructing the conveyance motor 57 to stop (step S303). In this way, the feed belt 54 stops immediately. Even at this time, the rotating disk 14 is maintained in the stopped state. If the feed belt 54 stops, the different denomination coin C to be stopped, which has been detected in step S103, stops on the outlet-side passage end portion 151. If the feed belt 54 stops, as described above, only one different denomination coin C to be stopped is located on the outlet-side passage end portion 151. However, even if there is the coin C on the upstream side at the time of normal rotation with respect to the different denomination coin C, there is no case where the identification counting unit 37 detects the peak value of the magnetic data of the coin C.

In the flow of the processing shown in steps S103 and S301 to S303 described above, if the different denomination coin C other than the coin of the denomination to be counted, that is, the coin C other than the falling target to be caused to fall into the falling portion 141, is detected based on the detection of the identification counting unit 37, the control unit 15 sets the different denomination coin to be one coin C to be stopped. The control unit 15 switches the conveyance motor 57 from the usual normal rotation state (the first rotation state) where the conveyance motor 57 rotates at the normal speed to the second slow normal rotation state (the second rotation state) where the conveyance motor 57 rotates at the second slow speed, in response to the detection of one coin C to be stopped by the identification counting unit 37. Thereafter, the stop control for stopping the conveyance motor 57 is performed in response to a change from the detection state of one different denomination coin C to be stopped by the identification counting unit 37 to the non-detection state.

Due to this stop control, one different denomination coin to be stopped is stopped on the outlet-side passage end portion 151 which is on the downstream side at the time of normal rotation with respect to the identification counting unit 37 in the outlet-side passage portion 112. Here, the outlet-side passage end portion 151 has a size in which one coin of the coins of all the denominations to be processed can remain, but two or more coins cannot remain. Therefore, the same applies to different denomination coins having the same outer diameter as a regular coin, and in this stop control, the coin C of the denomination to be counted during the batch processing, which is on the downstream side at the time of normal rotation of one different denomination coin to be stopped, falls into the falling hole 141.

The second slow normal rotation state switched from the usual normal rotation state in step S301 is continued as it is until it is switched to the stopped state in step S303.

In step S303, after the control unit 15 outputs the instruction signal instructing the conveyance motor 57 to stop, the control unit 15 writes 1 to the stop coin number counter (step S304). Here, the stop coin number counter indicates the number of coins C that have to pass through the identification counting unit 37 at the time of reverse rotation conveyance to be performed from then on. That is, one coin C is set to pass through the identification counting unit 37 during the subsequent reverse rotation conveyance.

Next, the control unit 15 outputs an instruction signal instructing the feeding motor 16 and the conveyance motor 57 to reversely rotate, and starts the timing of the return time (step S305). Then, a reverse rotation state is created where both the rotating disk 14 and the feed belt 54 reversely rotate.

Thereafter, the control unit 15 determines whether or not the stop coin number counter is 1 (step S306), and in a case where the stop coin number counter is 1 (step S306: YES), that is, in a case where instead of the coin of the denomination to be counted, one different denomination coin C which was a target to be stopped is located on the outlet-side passage end portion 151, whether or not the peak value of the magnetic data has been detected by the identification counting unit 37 is determined (step S307). Here, the coin C whose peak value is detected in step S307 is one different denomination coin C which was a target to be stopped and which remains on the outlet-side passage end portion 151, as described above.

In the determination in step S307, if the identification counting unit 37 detects the peak value of the magnetic data (step S307: YES), the control unit 15 again determines whether or not the peak value of the magnetic data has been detected by the identification counting unit 37 (step S308). The identification counting unit 37 usually detects only the peak value of the magnetic data of one different denomination coin C which was a target to be stopped, as described above, and therefore, in step S308, the peak value of the magnetic data is not detected. That is, step S307 and step S308 are processes for confirming that only one different denomination coin C has passed through the identification counting unit 37.

In step S307, the determination for detecting the coin C is performed according to whether or not the identification counting unit 37 detects the peak value of the magnetic data. This determination may be performed according to whether or not the identification counting unit 37 detects a level equal to or higher than a predetermined threshold value of the magnetic data. That is, the state where the identification counting unit 37 detects that the magnetic data is at a level equal to or higher than the predetermined threshold value may be defined as the detection state of the coin C, and the state where the identification counting unit 37 detects that the magnetic data is at a level lower than the threshold value may be defined as the non-detection state of the coin C. If the identification counting unit 37 detects that one coin C which was a target to be stopped has been changed from the detection state to the non-detection state, the control unit 15 may determine that the coin C has passed through the identification counting unit 37 at the time of the reverse rotation conveyance. Further, the same applies to the determination in step S308.

In step S308, if the identification counting unit 37 does not detect the peak value of the magnetic data, whether or not a predetermined reverse rotation drive time required to return all coins C remaining on the conveyance passage 60 to the rotating disk 14 has elapsed within the return time whose timing has been started in step S305 is determined (step S309). Here too, the design value of the reverse rotation drive time is set to, for example, 200 ms.

If the reverse rotation drive time has not elapsed within the return time (step S309: NO), the processing returns to step S308. Step S308 and step S309 are repeated until the reverse rotation drive time elapses within the return time. If the reverse rotation drive time elapses within the return time (step S309: YES), the control unit 15 outputs an instruction signal instructing the feeding motor 16 and the conveyance motor 57 to stop (step S310).

In this way, the rotating disk 14 stops and the feed belt 54 stops. The rotating disk 14 and the feed belt 54 are set to be in the reverse rotation state until the reverse rotation drive time elapses within the return time. In this way, if one different denomination coin C which was a target to be stopped has an outer diameter shorter than the length from the wall surface 72 to the tip of the support portion 103 or the length from the wall surface 82 to the tip of the support portion 101, it is possible to cause the coin to fall into the rejection hole 115. Further, in a case where it is not possible to cause the coin to fall into the rejection hole 115, both of the one different denomination coin C which was a target to be stopped and the coin C on the conveyance passage 60 on the upstream side at the time of normal rotation with respect to the one different denomination coin C can be returned to the rotating disk 14. As described above, the one different denomination coin C which was a target to be stopped returns to the rotating disk 14 at the end of this processing.

In step S310, if the control unit 15 outputs the instruction signal instructing the feeding motor 16 and the conveyance motor 57 to stop, the control unit 15 increments a retry counter by 1 (step S311), and whether or not the retry counter has reached a predetermined retry setting value is determined (step S312). If the retry counter has not reached the predetermined retry setting value (step S312: NO), the processing returns to step S101. If the retry counter has reached the predetermined retry setting value, error display (step S313) indicating that the different denomination coin C is mixed in and urging to perform the confirmation and the removal of the coin C are performed, and the batch processing is ended. Here, the predetermined retry setting value of the retry counter is configured such that any value can be freely set on the operation display unit 30 through an input operation.

For example, in a case where the retry setting value is set to 1, if the different denomination coin C is detected during the first batch processing and in step S311, the retry counter is incremented by 1 to become 1, the error display is performed in step S313 without returning to step S101, in other words, without performing retry, and the batch processing is ended.

Further, for example, in a case where the retry setting value is set to 2, if the different denomination coin C is detected during the first batch processing and in step S311, the retry counter is regarded as being 1, the processing returns to step S101 and the retry is performed. If the different denomination coin C is detected during the retry batch processing and in step S311, the retry counter is incremented by 1 to become 2, the error display is performed in step S313 and the batch processing is ended. In a case where a plurality of retry setting values are set in this manner, if it is possible to cause the different denomination coin C to fall into the rejection hole 115 with the reverse rotation conveyance as described above, then the batch processing can be restarted and continued as it is.

In the determination in step S308, if the identification counting unit 37 detects the peak value of the magnetic data that cannot be originally detected (step S308: YES), the control unit 15 determines that the coin C located on the downstream side at the time of normal rotation with respect to the one different denomination coin C which was a target to be stopped has been returned to the outlet-side passage portion 112. In this way, the control unit 15 stops the feeding motor 16 and the conveyance motor 57. Further, the control unit 15 performs error processing at the time of reverse rotation (step S314) for performing the error display indicating that the last coin in the batch processing has been returned on the operation display unit 30, and ends the batch processing. Here, the situation where the last coin C in the batch processing is detected is, for example, a case where the coin C that has fallen into the falling hole 141 is connected to the one different denomination coin C which was a target to be stopped with tape or the like, as described above, or the like.

In the flow of the processing shown in steps S304 to S309 described above, after the stop control described above is performed, the control unit 15 reversely rotates the conveyance motor 57 to perform switching to the conveyance of the coin C toward the upstream side at the time of normal rotation, which is opposite to the downstream side at the time of normal rotation. Thereafter, the detection state of one different denomination coin C to be stopped by the identification counting unit 37 is confirmed. If only one different denomination coin C to be stopped is detected by the identification counting unit 37, the control unit 15 can determine that none of the coins C conveyed in the direction of the downstream side at the time of normal rotation ahead of the one different denomination coin C to be stopped remain on the outlet-side passage portion 112.

Here, if a stop operation is input to the operation display unit 30 during the batch processing, the determination in step S105 becomes YES, and then the control unit 15 performs control similar to the case of determining that the number of remaining batch coins is 0, in step S105 described above.

According to the coin processing device 11 of the embodiment described above, the identification counting unit 37 detects one coin C to be stopped, which has been conveyed next to the last coin C to be processed in the batch processing. The control unit 15 switches the conveyance motor 57 from the first slow normal rotation state (the first rotation state) where the conveyance motor 57 rotates at the first slow speed to the second slow normal rotation state (the second rotation state) where the conveyance motor 57 rotates at the second slow speed, in response to the detection of the one coin C to be stopped by the identification counting unit 37, and then rotates the conveyance motor 57. In this way, the control unit 15 can stop the coin C to be stopped at an accurate position by switching the conveyance speed of the coin C to be stopped to a low speed and then stopping it. Accordingly, the coin processing device does not require a stopper mechanism. Therefore, it is possible to reduce the cost of the coin processing device, improve the degree of freedom of layout inside the device, and attain a reduction in noise and dust suppression.

Further, the identification counting unit 37 detects the different denomination coin C other than the coin of the denomination to be counted, that is, the coin C other than the falling target to be caused to fall into the falling portion 141. The control unit 15 regards this different denomination coin as one coin C to be stopped. The control unit 15 switches the conveyance motor 57 from the usual normal rotation state (the first rotation state) where the conveyance motor 57 rotates at the normal speed to the second slow normal rotation state (the second rotation state) where the conveyance motor 57 rotates at the second slow speed, in response to the detection of one coin C to be stopped by the identification counting unit 37, and then rotates the conveyance motor 57. In this way, the conveyance speed of the coin C to be stopped is switched to a low speed and then stopped, so that it is possible to stop the coin C to be stopped at an accurate position. Accordingly, the coin processing device does not require a stopper mechanism. Therefore, it is possible to reduce the cost of the coin processing device, improve the degree of freedom of layout inside the device, and attain a reduction in noise and dust suppression.

Further, the identification counting unit 37 detects one coin C to be stopped, which has been conveyed next to the last coin C to be processed in the batch processing. The control unit 15 switches the conveyance motor 57 from the first slow normal rotation state (the first rotation state) where the conveyance motor 57 rotates at the first slow speed to the second slow normal rotation state (the second rotation state) where the conveyance motor 57 rotates at the second slow speed, in response to the detection by the identification counting unit 37. Thereafter, the control unit 15 performs stop control for stopping the conveyance motor 57, in response to the change from the detection state of one coin C to be stopped by the identification counting unit 37 to the non-detection state. Due to this stop control, one coin C to be stopped is stopped on the outlet-side passage end portion 151 which is on the downstream side at the time of normal rotation with respect to the identification counting unit 37 in the outlet-side passage portion 112. Accordingly, even if the coin processing device does not have a stopper mechanism, the coin to be stopped can be kept on the outlet-side passage portion 112 without causing it to fall into the falling hole 141.

Here, the outlet-side passage end portion 151 has a size in which one coin C of the coins of all the denominations of the coins to be processed can remain, but two or more coins cannot remain. Therefore, in this stop control, the last coin C to be processed in the batch processing, which is adjacent to the downstream side at the time of normal rotation of one coin C to be stopped, and the previous coin C are caused to fall into the falling hole 141. In this manner, only one coin C to be stopped can be stopped (remain) at the outlet-side passage end portion 151, and all the coins C to be processed in the batch processing, which have been conveyed in the direction of the downstream side at the time of normal rotation ahead of the one coin, can be caused to fall into the falling hole 141. Accordingly, even if the coin processing device does not have a stopper mechanism, all the coins C to be processed in the batch processing, which have been conveyed in the direction of the downstream side at the time of normal rotation ahead of one coin C to be stopped, which has been conveyed next to the last coin C to be processed in the batch processing, can be caused to fall into the falling hole 141.

Further, the identification counting unit 37 detects the different denomination coin C other than the coin of the denomination to be counted, that is, the coin C other than the falling target to be caused to fall into the falling portion 141. The control unit 15 regards this different denomination coin as one coin C to be stopped. The control unit 15 switches the conveyance motor 57 from the usual normal rotation state (the first rotation state) where the conveyance motor 57 rotates at the normal speed to the second slow normal rotation state (the second rotation state) where the conveyance motor 57 rotates at the second slow speed, in response to the detection of the one coin C to be stopped by means of the identification counting unit 37. Thereafter, the stop control for stopping the conveyance motor 57 is performed in response to a change from the detection state of one different denomination coin C to be stopped by the identification counting unit 37 to the non-detection state. Due to this stop control, one different denomination coin C to be stopped can be stopped on the outlet-side passage end portion 151 which is on the downstream side at the time of normal rotation with respect to the identification counting unit 37 in the outlet-side passage portion 112. Accordingly, even if the coin processing device does not have a stopper mechanism, the different denomination coin C to be stopped can be kept on the outlet-side passage portion 112 without causing it to fall into the falling hole 141.

The outlet-side passage end portion 151 has a size in which one coin C of the coins of all the denominations of the coins to be processed can remain, but two or more coins cannot remain. This also applies to a different denomination coin C with the same outer diameter as the regular coin C. In this stop control, the coin C of the denomination to be counted during the batch processing, which is on the downstream side at the time of normal rotation of one different denomination coin C to be stopped, falls into the falling hole 141. In this manner, only one different denomination coin C to be stopped can be stopped at the outlet-side passage end portion 151, and the coins C of all the denominations to be counted, which have been conveyed in the direction of the downstream side at the time of normal rotation ahead of the coin C, can be caused to fall into the falling hole 141. Accordingly, even if the coin processing device does not have a stopper mechanism, the coins C of all the denominations to be counted, which have been conveyed in the direction of the downstream side at the time of normal rotation ahead of one different denomination coin C to be stopped, can be caused to fall into the falling hole 141.

Further, the control unit 15 performs the stop control described above in response to the detection of the last coin C in the batch processing, and then reversely rotates the conveyance motor 57 to switch the conveyance of the coin C from the downstream side at the time of normal rotation toward the upstream side at the time of normal rotation opposite to the downstream side. Thereafter, the control unit 15 confirms the detection state of one coin C to be stopped, which has been conveyed next to the last coin C to be processed in the batch processing, by the identification counting unit 37. If only one coin C to be stopped is detected by the identification counting unit 37, the control unit 15 can determines that none of the number of coins C to be processed in the batch processing, which have been conveyed in the direction of the downstream side at the time of normal rotation ahead of one coin C to be stopped, remain on the outlet-side passage portion. Accordingly, even if the coin processing device does not have a stopper mechanism, it is possible to determine that all the coins C to be processed in the batch processing, which have been conveyed in the direction of the downstream side at the time of normal rotation ahead of one coin C to be stopped, have fallen into the falling hole 141.

Further, the control unit 15 determines the falling of all the number of coins C to be processed in the batch processing by performing conveyance control for reciprocating one coin C to be stopped across the detection unit. That is, in order to perform this determination, the detection unit need only be provided with one magnetic sensor, and it is not necessary to provide another sensor on the downstream side at the time of normal rotation from the detection unit. Therefore, the effect of further suppressing the part cost of the coin processing device is exhibited.

Further, the control unit 15 performs the stop control described above in response to the detection of the different denomination coin C, and then reversely rotates the conveyance motor 57 to switch the conveyance of the coin C from the downstream side at the time of normal rotation toward the upstream side at the time of normal rotation opposite to the downstream side. Thereafter, the control unit 15 confirms the detection state of one different denomination coin C to be stopped by the identification counting unit 37. If only one different denomination coin C to be stopped is detected by the identification counting unit 37, the control unit 15 can determine that the coins C of all the denominations to be counted, which have been conveyed in the direction of the downstream side at the time of normal rotation ahead of one different denomination coin C to be stopped, do not remain on the outlet-side passage portion 112. Accordingly, even if the coin processing device does not have a stopper mechanism, it is possible to determine that the coins C of all the denominations to be counted, which have been conveyed in the direction of the downstream side at the time of normal rotation ahead of one different denomination coin C to be stopped, have fallen into the falling hole 141.

Further, since the identification counting unit 37 includes a magnetic sensor, the detection of one coin C to be stopped and the detection of the different denomination coin C other than the designated denomination can be performed with the same magnetic sensor. Therefore, the cost of the coin processing device can be further reduced.

Further, the control unit 15 switches the conveyance motor 57 from the usual normal rotation state (the third rotation state) having a faster speed than the first slow normal rotation state (the first rotation state) where the conveyance motor 57 rotates at the first slow speed to the first slow normal rotation state (the first rotation state), in response to the detection of the last coin C to be processed in the batch processing, which is one coin downstream from one coin C to be stopped at the time of normal rotation, by the identification counting unit 37. Therefore, the conveyance speed of the coin C to be stopped, which has been conveyed next to the last coin C to be processed in the batch processing, can be switched to a lower speed and then stopped. Accordingly, the control unit 15 can stop the coin C to be stopped at a more accurate position.

INDUSTRIAL APPLICABILITY

The present invention can be applied to coin processing devices which are installed in financial institutions, stores, or the like, and can provide a coin processing device in which the cost of the coin processing device is reduced, the degree of freedom of layout inside the device is improved, and a reduction in noise and dust suppression are attained.

REFERENCE SIGNS LIST

11: coin processing device
15: control unit
37: identification counting unit (detection unit)
54: feed belt
57: conveyance motor
61: inlet-side passage portion
112: outlet-side passage portion
141: falling hole (falling portion)
151: outlet-side passage end portion
C: coin

The invention claimed is:

1. A coin processing device comprising:

a feed belt configured to normally rotate in contact with an upper side of a coin, which is fed from a rotating disk, to convey the coin to a conveyance passage extending from an inlet-side passage portion to an outlet-side passage portion;

a conveyance motor configured to normally rotate the feed belt during the normal rotation;

a detection unit configured to detect the coin passing through a position determined in advance in the conveyance passage; and a control unit configured to switch the conveyance motor from a usual normal rotation state where the conveyance motor normally rotates at a usual normal rotation speed to a first slow normal rotation state where the conveyance motor normally rotates at a first slow normal rotation speed slower than the usual normal rotation speed, and configured to switch the conveyance motor from the first slow normal rotation state to a second slow normal rotation state where the conveyance motor normally rotates at a second slow normal rotation speed slower than the first slow normal rotation speed, in response to detection of the coin by the detection unit, and then rotates the conveyance motor, wherein the control unit is configured to perform batch processing in which the control unit conveys a predetermined numbers of the coins of a predetermined denomination set to the outlet-side passage portion, switch the conveyance motor from the usual normal rotation state to the first slow normal rotation state in response to the detection unit detecting a last coin of the predetermined numbers of the coins subject to the batch processing, switch the conveyance motor from the first slow rotation state to the second slow rotation state in response to the detection unit detecting a coin to be stopped following the last coin subject to the batch processing in a case where the coin to be stopped is conveyed on the conveyance passage following the last coin, after switching the conveyance motor from the first slow rotation state to the second slow rotation state, stop the conveyance motor in response to the detection unit changing from detecting the coin to be stopped to not detecting the coin to be stopped so that the control unit causes the coin to be stopped to stop at an end portion on a downstream side of the outlet-side passage portion, and thereafter reversely rotate the conveyance motor to perform conveyance of the coin to be stopped toward an upstream side opposite to the downstream side so as to return the coin to be stopped to the rotating disk.

* * * * *